(12) United States Patent
Owens et al.

(10) Patent No.: US 10,313,433 B2
(45) Date of Patent: Jun. 4, 2019

(54) METHOD AND SYSTEM FOR REGISTERING SOFTWARE SYSTEMS AND DATA-SHARING SESSIONS

(71) Applicant: ThoughtWire Holdings Corp., Toronto (CA)

(72) Inventors: Stephen Paul Owens, Caledon (CA); Michael Lorne Monteith, Toronto (CA)

(73) Assignee: THOUGHTWIRE HOLDINGS CORP., Toronto (CA)

( * ) Notice: Subject to any disclaimer, the term of this patent is extended or adjusted under 35 U.S.C. 154(b) by 327 days.

(21) Appl. No.: 14/165,261

(22) Filed: Jan. 27, 2014

(65) Prior Publication Data

US 2014/0280845 A1   Sep. 18, 2014

Related U.S. Application Data

(63) Continuation-in-part of application No. 13/804,168, filed on Mar. 14, 2013, now Pat. No. 9,742,843, and
(Continued)

(51) Int. Cl.
*G06F 9/44* (2018.01)
*G06Q 30/00* (2012.01)
(Continued)

(52) U.S. Cl.
CPC ........ *H04L 67/1095* (2013.01); *H04L 67/141* (2013.01); *H04L 67/322* (2013.01); *H04L 41/5064* (2013.01)

(58) Field of Classification Search
CPC .......................... H04L 67/1095; H04L 67/141
(Continued)

(56) References Cited

U.S. PATENT DOCUMENTS 4,609,995 A * 9/1986 Hasebe ................. G06F 13/364
                                                              710/244
5,884,282 A * 3/1999 Robinson ............. G06Q 10/025
                                                              705/7.33
(Continued)

FOREIGN PATENT DOCUMENTS

EP           2650832 A1    10/2013

OTHER PUBLICATIONS

Search Report for corresponding EP Patent Application No. 14275068.6, dated Apr. 1, 2015.

(Continued)

*Primary Examiner* — Esther B. Henderson
*Assistant Examiner* — Golam Mahmud
(74) *Attorney, Agent, or Firm* — Kagan Binder PLLC

(57) ABSTRACT

A method for registering software systems in data-sharing sessions is provided. A set of data-sharing session definitions are stored in storage of a computer system, each of said data-sharing session definitions identifying a set of software system types permitted to participate in data-sharing sessions governed by the data-sharing session definition. A participant registration request is received from a first software system. A priority value is determined, via the computer system for the participant registration request, for each of a first subset of the data-sharing session definitions. The first software system is registered in one of the data-sharing sessions governed by one of the data-sharing session definitions selected at least partially based on the priority values.

38 Claims, 27 Drawing Sheets

Related U.S. Application Data a continuation-in-part of application No. 13/967,643, filed on Aug. 15, 2013.

(51) Int. Cl.
*G06F 17/30* (2006.01)
*H04L 29/08* (2006.01)
*H04L 12/24* (2006.01)

(58) Field of Classification Search
USPC ........................................................ 709/204
See application file for complete search history.

(56) References Cited

U.S. PATENT DOCUMENTS

| | | | |
|---|---|---|---|
| 6,292,804 B1 | 9/2001 | Ardoin et al. | |
| 6,442,550 B1* | 8/2002 | Rajamony | G06Q 30/02 707/999.01 |
| 6,732,331 B1 | 5/2004 | Alexander | |
| 7,526,481 B1 | 4/2009 | Cusson et al. | |
| 7,680,820 B2 | 3/2010 | Denoue et al. | |
| 7,853,618 B2 | 12/2010 | Yuan et al. | |
| 7,934,207 B2 | 4/2011 | Gustafsson et al. | |
| 7,971,179 B2 | 6/2011 | Venolia | |
| 8,296,362 B2* | 10/2012 | Roberts | H04L 12/1822 709/204 |
| 8,301,660 B2 | 10/2012 | Yalamanchi | |
| 8,676,273 B1* | 3/2014 | Fujisaki | H04M 1/6505 455/567 |
| 9,244,965 B2* | 1/2016 | Monteith | G06F 16/2246 |
| 2002/0010744 A1 | 1/2002 | Prell et al. | |
| 2002/0147019 A1* | 10/2002 | Uhlik | H04W 76/25 455/452.1 |
| 2003/0074352 A1 | 4/2003 | Raboczi et al. | |
| 2003/0105746 A1 | 6/2003 | Stickler | |
| 2003/0236820 A1* | 12/2003 | Tierney | G06F 21/10 709/203 |
| 2004/0015426 A1 | 1/2004 | Tadayon et al. | |
| 2004/0044866 A1 | 3/2004 | Casazza | |
| 2004/0049697 A1 | 3/2004 | Edwards, Jr. et al. | |
| 2004/0148333 A1 | 7/2004 | Manion et al. | |
| 2004/0221053 A1 | 11/2004 | Codella et al. | |
| 2004/0243531 A1 | 12/2004 | Dean | |
| 2005/0021523 A1 | 1/2005 | Farag | |
| 2005/0044063 A1 | 2/2005 | Barsness et al. | |
| 2005/0055211 A1 | 3/2005 | Claudatos et al. | |
| 2005/0060342 A1 | 3/2005 | Farag | |
| 2005/0066118 A1 | 3/2005 | Perry et al. | |
| 2005/0165719 A1 | 7/2005 | Greenspan et al. | |
| 2005/0202392 A1 | 9/2005 | Allen et al. | |
| 2006/0004847 A1 | 1/2006 | Claudatos et al. | |
| 2006/0117073 A1 | 6/2006 | Bosworth et al. | |
| 2006/0178910 A1* | 8/2006 | Eisenberger | G06Q 10/00 705/3 |
| 2006/0190455 A1 | 8/2006 | Braddy et al. | |
| 2007/0011147 A1 | 1/2007 | Falkenberg | |
| 2007/0022107 A1 | 1/2007 | Yuan et al. | |
| 2007/0033109 A1* | 2/2007 | Patten | G06F 21/6245 705/26.1 |
| 2007/0033142 A1* | 2/2007 | Patten | G06Q 10/10 705/51 |
| 2007/0088831 A1 | 4/2007 | Pallamreddy et al. | |
| 2007/0124291 A1 | 5/2007 | Hassan et al. | |
| 2007/0180122 A1 | 8/2007 | Barrett | |
| 2007/0186082 A1 | 8/2007 | Kissell | |
| 2007/0240055 A1 | 10/2007 | Ting et al. | |
| 2007/0277148 A1 | 11/2007 | Venolia | |
| 2008/0040308 A1 | 2/2008 | Ranganathan et al. | |
| 2008/0059500 A1* | 3/2008 | Symens | G06Q 10/10 |
| 2008/0082612 A1 | 4/2008 | Declerck | |
| 2008/0134207 A1 | 6/2008 | Chamieh et al. | |
| 2008/0198871 A1 | 8/2008 | Shahidi et al. | |
| 2008/0208676 A1 | 8/2008 | Williams et al. | |
| 2008/0215580 A1 | 9/2008 | Altinel | |
| 2008/0244075 A1 | 10/2008 | Kuo et al. | |
| 2008/0256253 A1 | 10/2008 | Branson et al. | |
| 2008/0313229 A1 | 12/2008 | Taswell | |
| 2008/0313296 A1 | 12/2008 | Muller | |
| 2008/0320417 A1 | 12/2008 | Begley et al. | |
| 2009/0006627 A1 | 1/2009 | Castellucci et al. | |
| 2009/0030982 A1 | 1/2009 | Spivack et al. | |
| 2009/0144365 A1* | 6/2009 | Korat | G06Q 10/10 709/204 |
| 2009/0216714 A1 | 8/2009 | Gonzalez et al. | |
| 2009/0265464 A1 | 10/2009 | Jakobson | |
| 2009/0327502 A1 | 12/2009 | Brewer | |
| 2010/0131868 A1 | 5/2010 | Chawla et al. | |
| 2010/0179836 A1 | 7/2010 | Hasan et al. | |
| 2011/0040846 A1 | 2/2011 | Weinryb et al. | |
| 2011/0098056 A1* | 4/2011 | Rhoads | G01C 21/20 455/456.1 |
| 2011/0131119 A1 | 6/2011 | Ernst | |
| 2011/0138446 A1 | 6/2011 | Barrett et al. | |
| 2011/0179110 A1 | 7/2011 | Soloway | |
| 2011/0209138 A1* | 8/2011 | Monteith | G06F 16/2246 717/172 |
| 2011/0246530 A1 | 10/2011 | Malafsky | |
| 2011/0296043 A1 | 12/2011 | Sutton et al. | |
| 2011/0314387 A1* | 12/2011 | Gold | G06Q 10/10 715/751 |
| 2011/0314388 A1 | 12/2011 | Wheatley | |
| 2012/0232929 A1 | 9/2012 | Experton | |
| 2012/0310900 A1* | 12/2012 | Monteith | G06F 16/2246 707/689 |
| 2013/0097086 A1 | 4/2013 | Dala et al. | |
| 2013/0151301 A1* | 6/2013 | Robb | G06F 9/54 705/7.18 |
| 2013/0212260 A1* | 8/2013 | Zeitune | H04L 67/22 709/224 |
| 2013/0268357 A1* | 10/2013 | Heath | H04L 63/00 705/14.53 |
| 2013/0318347 A1 | 11/2013 | Moffat | |
| 2015/0213411 A1 | 7/2015 | Swanson et al. | |

OTHER PUBLICATIONS

Office Action for U.S. Appl. No. 13/804,168, dated Feb. 3, 2015.
Office Action for U.S. Appl. No. 13/578,552, dated Mar. 13, 2015.
Search Report for corresponding UK Patent Application No. GB1404645.2, dated Sep. 26, 2014.
Search Report for corresponding UK Patent Application No. GB1404638.7, dated Sep. 22, 2014.
Office Action for U.S. Appl. No. 12/710,099, dated Jan. 5, 2015.
International Search Report and Written Opinion for International Application No. PCT/CA2011/050020, dated Apr. 18, 2011.
Office Action for U.S. Appl. No. 12/710,099, dated Aug. 26, 2013.
Office Action for U.S. Appl. No. 13/578,552, dated Jul. 25, 2014.
Office Action for U.S. Appl. No. 13/804,168, dated Feb. 2, 2015.
Google, "Gadget-to-Gadget Communication (Deprecated)", http://code.google.com/apis/gadgets/docs/pubsub.html.
Expressor Software, "expressor data integration products", http://www.expressor-software.com/products-overview.htm.

* cited by examiner

METHOD AND SYSTEM FOR REGISTERING SOFTWARE SYSTEMS AND DATA-SHARING SESSIONS

This application is a continuation-in-part of U.S. application Ser. No. 13/804,168 filed on Mar. 14, 2013, and of U.S. application Ser. No. 13/967,643 filed on Aug. 15, 2013, the entire contents of which are incorporated herein by reference.

FIELD OF THE INVENTION

The present invention relates generally to information systems. In particular, the invention relates to a method and system for registering software systems in data-sharing sessions.

BACKGROUND OF THE INVENTION

Much of what the average individual experiences as work, learning or play is accomplished through their interactions with computers and software. Billions of times a day, hundreds of millions of people interact with computers and software in their daily pursuits. Increasingly, people are faced with the challenge of working with multiple independent software systems to perform everything from the most mundane to the most complicated tasks. As used herein, "software system" refers to one or more applications, programs, services, databases, firmware, executed scripts, middleware, sets of functionality available via web pages, etc. that share and/or receive data. In many cases, no single software system contains all of the required information or functionality and it is often the individual's job to act as the point of connection amongst the software systems they use.

Various solutions have been developed to address this problem. In particular, U.S. patent application Ser. No. 13/804,168 filed on Mar. 14, 2013, the entire contents of which are incorporated herein by reference, discloses a system wherein various software systems executing on various computing devices can share data item values between them in data-sharing sessions operated by a data-sharing server computer system. The software systems in a data-sharing session share values for semantically-identified data items and request data items that they need based on the semantics of the data items. The data-sharing server computer system provides software systems data item values shared by other software systems in the data-sharing session that semantically match the data items they requested whenever the data item values are updated in the data-sharing session.

The types of data-sharing sessions and the software systems permitted to participate therein are pre-defined. When a software system would like to join a data-sharing session, it registers with the data-sharing server computer system with an identifier of the type of data-sharing session that it wants to join. In order to have the software system indicate what type of data-sharing session it would like to join, the software systems are either configured directly or provided that configuration from another software system. If it is desired to have the software system register in a data-sharing session of a different type than it is configured to register in, either the software system or another software system that provides the configuration must be configured differently. This can be challenging where the software systems are installed on numerous client computing devices, such as personal workstations, etc. Further, any change to the identifiers used to specify a data-sharing session type must be reflected in the configuration of the software systems. Due to the effort required to reconfigure the software systems to participate in a different type of data-sharing session, they cannot be dynamically reconfigured as desired.

It is therefore an object of the invention to provide a novel method and system for registering software systems in data-sharing sessions.

SUMMARY OF THE INVENTION

According to an aspect, there is provided a method for registering software systems in data-sharing sessions, comprising:

storing, in storage of a computer system, a set of data-sharing session definitions, each of said data-sharing session definitions identifying a set of software system types permitted to participate in data-sharing sessions governed by said data-sharing session definition;

receiving a participant registration request from a first software system;

determining, via said computer system for said participant registration request, a priority value for each of a first subset of said data-sharing session definitions; and registering said first software system in one of said data-sharing sessions governed by one of said data-sharing session definitions selected at least partially based on said priority values.

The first subset of the data-sharing session definitions can correspond to the data-sharing session definitions identifying one of the software system types corresponding to the first software system. The computer system can limit participation in each the data-sharing session to one of each software system type identified in the data-sharing session definition governing the data-sharing session, and, prior to the registering, and can create a new one of the data-sharing sessions governed by the one selected data-sharing session definition if there is an absence of the data-sharing sessions governed by the one selected data-sharing session definition in which the first software system can be registered.

The determining can include retrieving the priority values associated with the first software system. The priority values can also be associated with a user role, a time period, or a user.

The determining can include:

identifying a second subset of said first subset of said data-sharing session definitions associated with said data-sharing sessions having capacity for said first software system; and increasing at least some of said priority values for said second subset.

The determining can include:

identifying a third subset of said first subset of said data-sharing session definitions associated with said data-sharing sessions in which other software systems of said software system type of said first software system are registered; and decreasing at least some of said priority values in said third subset.

The determining can include:

identifying a fourth subset of said first subset of said data-sharing session definitions associated with said data-sharing sessions having capacity for said first software system and in which at least one other software system of a key software system type is registered; and increasing at least some of said priority values for said second subset.

The determining can include:

identifying a fifth subset of said first subset of said data-sharing session definitions associated with said data-sharing sessions having capacity for said first software system and in which key indicator data has been shared by another software system; and increasing at least some of said priority values for said second subset.

The first software system can be associated with a first user, and the determining can include:

determining which of said data-sharing session definitions govern each of said data-sharing sessions associated with a group of other users in which other software systems of said one software system type are registered in; and adjusting said priority values for said data-sharing session definitions for said data-sharing sessions in which said other software systems are registered in.

The method can include:

launching a second software system identified in said one data-sharing session definition as permitted to participate in said data-sharing sessions governed by said one data-sharing session definition.

The first software system can be executed by a personal computing device and the launching of the second software system can occur on the personal computing device.

The determining can include calculating the priority values using a formula. Heuristic data can an input in the formula. The heuristic data can include identifiers of the data-sharing definitions used to create the data-sharing sessions that were most recently created, identifiers of the data-sharing definitions used to create the data-sharing sessions that were earliest created, identifiers of the data-sharing definitions used to create the data-sharing sessions in which the most recent data-sharing activity occurred, identifiers of the data-sharing definitions most often used to create the data-sharing sessions across a group of users, and/or identifiers of the data-sharing definitions used to create the data-sharing sessions successfully used to complete tasks.

According to another aspect of the invention, there is provided a method for registering software systems in data-sharing sessions, comprising:

storing, in storage of a computer system, a set of data-sharing session definitions, each of said data-sharing session definitions identifying a set of software system types permitted to participate in data-sharing sessions governed by said data-sharing session definition;

receiving a participant registration request from a software system;

determining, via said computer system for said participant registration request, a priority value for each of a first subset of said data-sharing session definitions;

presenting a list of said first subset of said data-sharing session definitions ordered using said priority values; and registering said software system in a data-sharing session governed by one of said data-sharing session definitions selected by a user from said list.

The first subset of the data-sharing session definitions can correspond to the data-sharing session definitions identifying one of the software system types corresponding to the first software system.

The method can further include:

recording said one data-sharing session definition selected by said user; and increasing said priority value for said one data-sharing session definition when subsequently determining said priority value for said one-data sharing session definition.

According to another aspect of the invention, there is provided a computer system for registering software systems in data-sharing sessions, comprising:

a processor;

storage storing a set of data-sharing session definitions, each of said data-sharing session definitions identifying a set of software system types permitted to participate in data-sharing sessions governed by said data-sharing session definition; and a server executed by said processor and receiving a participant registration request from a first software system, determining, for said participant registration request, a priority value for each of a first subset of said data-sharing session definitions, and registering said first software system in one of said data-sharing sessions governed by one of said data-sharing session definitions selected at least partially based on said priority values.

The first subset of the data-sharing session definitions can correspond to the data-sharing session definitions identifying one of the software system types corresponding to the first software system. The server can limit participation in each the data-sharing session to one of each the software system type identified in the data-sharing session definition governing the data-sharing session, and prior to the registering, the server can create a new one of the data-sharing sessions governed by the one selected data-sharing session definition if there is an absence of the data-sharing sessions governed by the one selected data-sharing session definition in which the first software system can be registered.

The server can retrieve the priority values associated with the first software system. The priority values can also be associated with a user role, a time period, or a user.

The server can identify a second subset of the first subset of the data-sharing session definitions associated with the data-sharing sessions having capacity for the first software system, and can increase at least some of the priority values for the second subset.

The server can identify a third subset of the first subset of the data-sharing session definitions associated with the data-sharing sessions in which other software systems of the software system type of the first software system are registered, and can decrease at least some of the priority values in the third subset.

The first software system can be associated with a first user, and the server can determine which of the data-sharing session definitions govern each of the data-sharing sessions associated with a group of other users in which other software systems of the one software system type are registered in, and can adjust the priority values for the data-sharing session definitions for the data-sharing sessions in which the other software systems are registered in.

The server can launch a second software system identified in the one data-sharing session definition as permitted to participate in the data-sharing sessions governed by the one data-sharing session definition.

According to still another aspect of the invention, there is provided a computer system for registering software systems in data-sharing sessions, comprising:

a processor;

storage storing a set of data-sharing session definitions, each of said data-sharing session definitions identifying a set of software system types permitted to participate in data-sharing sessions governed by said data-sharing session definition; and a server executed by said processor and receiving a participant registration request from a software system, determining, for said participant registration request, a priority value for each of a first subset of said data-sharing session definitions, presenting a list of said first subset of said data-sharing session definitions ordered using said priority values, and registering said software system in a data-sharing session governed by one of said data-sharing session definitions selected by a user from said list.

The first subset of the data-sharing session definitions can correspond to the data-sharing session definitions identifying one of the software system types corresponding to the first software system.

The server can record the one data-sharing session definition selected by the user, and can increase the priority value for the one data-sharing session definition when subsequently determining the priority value for the one-data sharing session definition.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
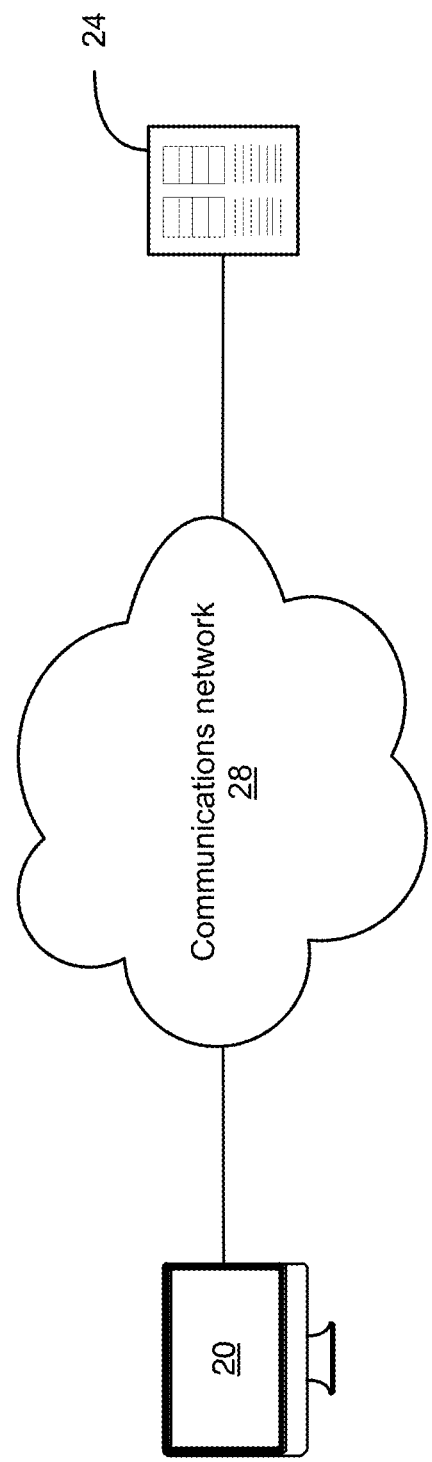
FIG. 1 shows a high-level architecture of a data-sharing server computer system for enabling data-sharing between software systems in accordance with an embodiment of the invention and its operating environment.

The invention provides a new method and system for registering software systems in data-sharing sessions. A set of data-sharing session definitions are stored, each identifying a set of software system types permitted to participate in data-sharing sessions governed by the data-sharing session definition. Upon receiving a participant registration request from a software system, a priority value for each of a subset of the data-sharing session definitions is determined for the participant registration request. The software system is then registered in a data-sharing session corresponding to one of the data-sharing session definitions selected at least partially based on the priority values.

Software systems generally represent resources that a person has access to. The resources can include data sources and/or functionality, such as web applications, databases, REST services and desktop applications, such as Microsoft Excel. Further, software systems can have multiple components that execute on the same or on two or more computing devices. For example, a web page that is served to and is executed by a personal computing device can interact with a web server computer system to provide access to resources available through the web server computer system, such as an application server or a database. Collectively, the web page, the web server computer system and other resources to which it is coupled form a software system.

Software systems assist in the completion of tasks in the system by participating in data-sharing sessions referred to as "collaborations". A "collaboration" is an arena managed by a stateful data-sharing service executed on the data-sharing server computer system in which each software system can share semantically identified data items and specify data that they need based on the semantics of that data. A collaboration is typically designed for the completion of a task. The stateful data-sharing service matches data shared by software systems with data other software systems requested using the semantic descriptions provided for both, and then notifies those other software systems when data matching what they requested is updated.

Collaboration definitions are used by the system to create and manage collaborations. They are akin to policies that specify what software systems can participate and what data they can share or request. Some types of software systems can be configured to act as participants in various types of collaborations.

By determining priority values for a subset of the collaboration definitions upon receiving a participant registration request from a software system, and by registering the software system in a collaboration corresponding to one of the collaboration definitions selected at least partially based on the priority values, software systems can be registered in a collaboration of a type that is best suited for the circumstances. Such circumstances can be, for example, the user role, the specific user, the day and/or time, the types of collaborations actively used by other users, etc. As the system interacts with software systems specified in collaboration definitions on the user's behalf, this allows the system to help the user better use multiple tools together and leverage other available resources without having to explicitly access those resources. Software users have trouble keeping up with the availability of new capability and information in their computing environment. The method presented helps automate decision making about which sets of tools work well together and when they should be used. Through this mechanism, when users launch the tools they are familiar with they can automatically take advantage of broader resources and have them made into a cohesive whole for them. This results in a far less disruptive workflow for the user with less retraining required as new capabilities are made available.

FIG. 1 shows a computer system for managing data-sharing sessions in accordance with an embodiment of the invention and its operating environment. A personal computing device, desktop computer 20, is in communication with a data-sharing server computer system 24 over a communications network 28.

As used herein, "personal computing device" is a computing device with which a user directly interacts. Examples of personal computing devices include smartphones, tablet computing devices, personal computers, smart thermostats, portable media players, global positioning system units, and display panels.

In the illustrated example, the desktop computer 20 is representative of the desktop computer 20 used by various people at a company providing services. These people include employees with three different roles: sales, accounting, and professional services. People with a sales role are primarily concerned with customer relationships and communication histories with customers. People with an accounting role are primarily concerned with the financial accounts of the customers. People with a professional services role are primarily concerned with the status of customer projects. The desktop computer 20 executes a variety of applications that talk to enterprise databases for contact management, project management, support, sales and accounting.

The data-sharing server computer system 24 manages the exchange of data between the various applications. The data-sharing server computer system 24 is a computer system that can include one or more physical computers, but is a single physical computer in the illustrated embodiment. The communications network 28 may be a wired network, a wireless network, or a combination thereof.

Data-sharing Server Computer System

Figure 2:
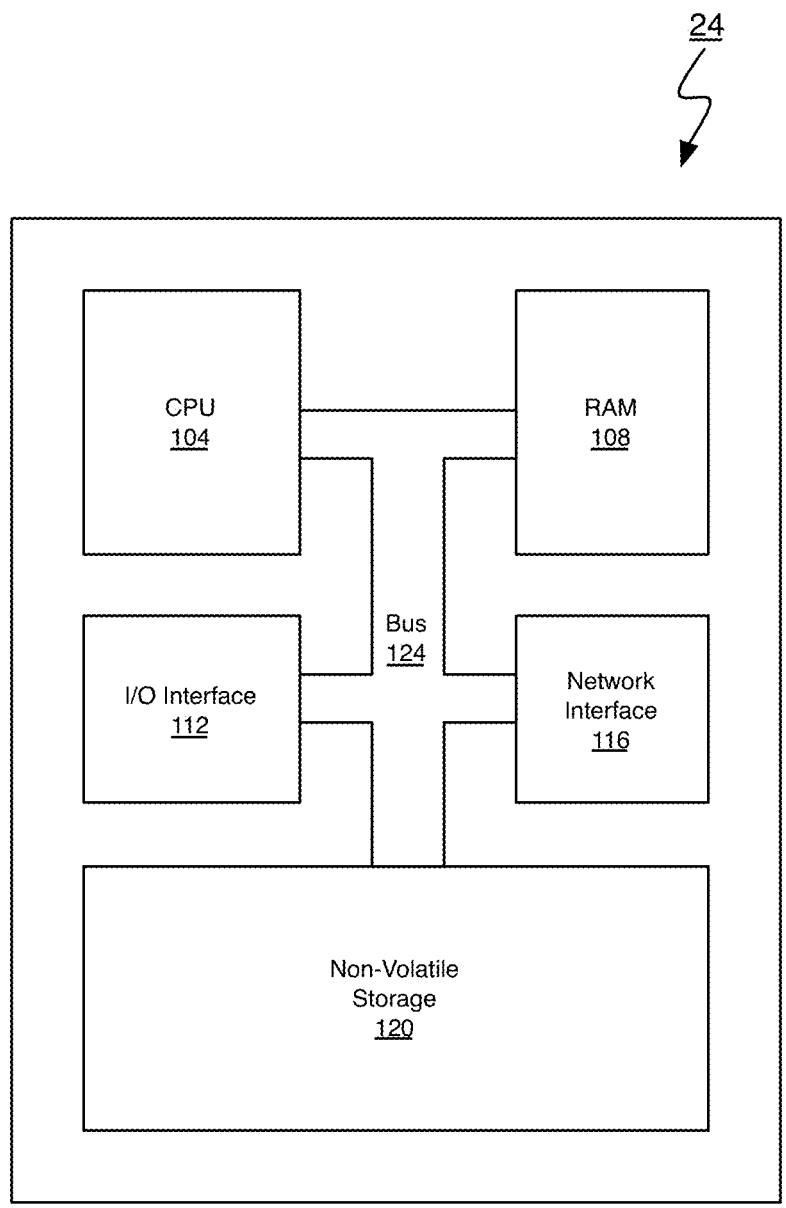
FIG. 2 shows a schematic diagram of the data-sharing server computer system of FIG. 1.

FIG. 2 is a high-level schematic diagram of the data-sharing server computer system 24 of FIG. 1. As shown, the data-sharing server computer system 24 has a number of physical and logical components, including a central processing unit ("CPU") 104, random access memory ("RAM") 108, an input/output ("I/O") interface 112, a network interface 116, non-volatile storage 120, and a local bus 124 enabling the CPU 104 to communicate with the other components. The CPU 104 executes an operating system, a stateful data-sharing service and possibly one or more software system components. RAM 108 provides relatively-responsive volatile storage to the CPU 104. The I/O interface 112 allows for input to be received from one or more devices, such as a keyboard, a mouse, etc., and outputs information to output devices, such as a display and/or speakers. The network interface 116 permits communication with other computing devices, such as tablet 20a and desktop computer 20. Non-volatile storage 120 stores the operating system and programs, including computer-executable instructions and artefacts for implementing the stateful data-sharing service and the software system components, if any. The data-sharing server computer system 24 may also use part of the non-volatile storage 120 as a temporary swap file that augments the volatile storage provided by RAM 108. During operation of the data-sharing server computer system 24, the operating system, the programs and the artefacts may be retrieved from the non-volatile storage 120 and placed in volatile storage to facilitate execution. Data shared by software systems is maintained by the stateful data-sharing service in volatile storage.

Figure 3:
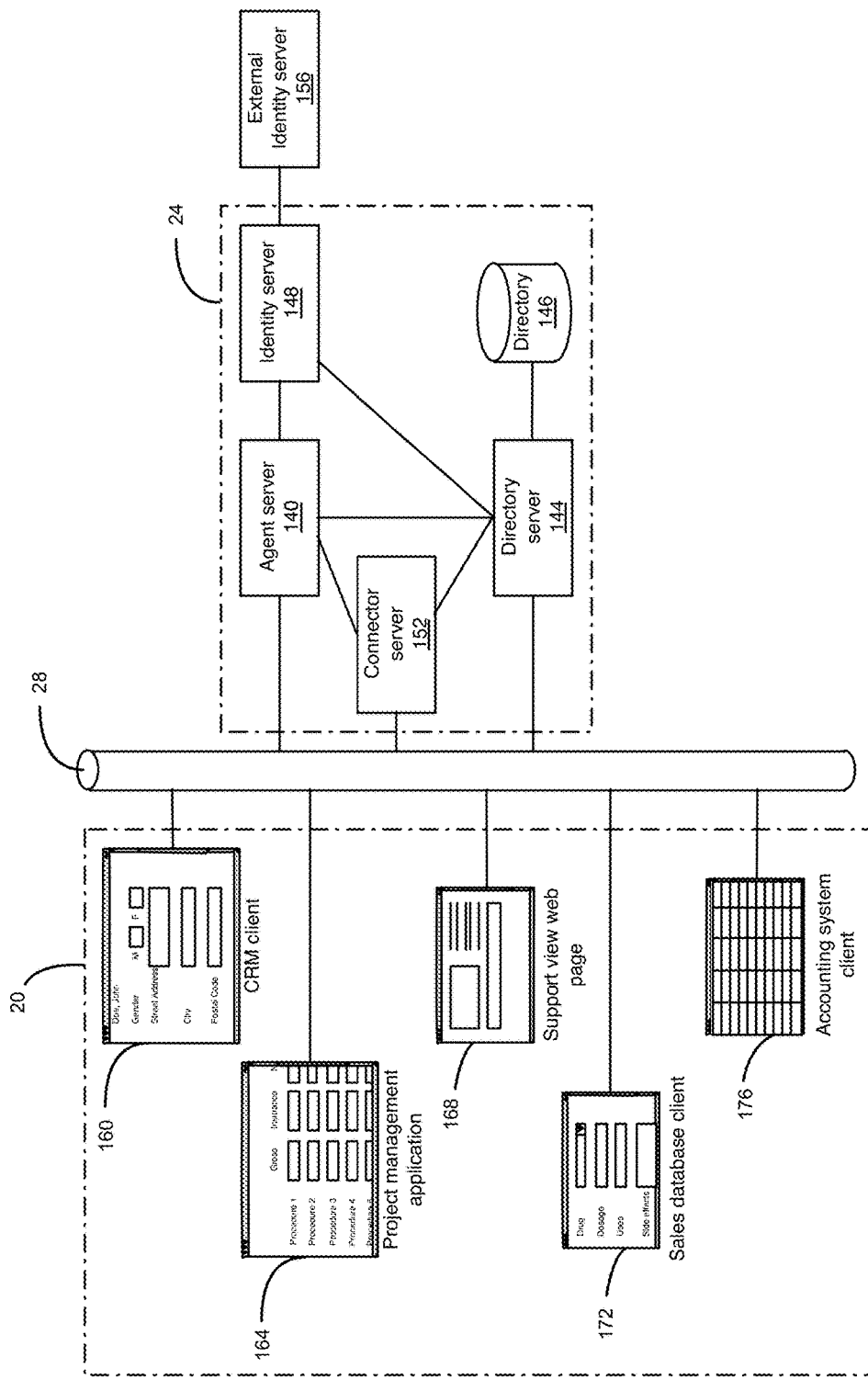
FIG. 3 shows software systems and various components of a stateful data-sharing service executing on the hardware of FIG. 1.

Referring now to FIGS. 1 and 3, various logical and physical components of the system are shown and will be described. The stateful data-sharing service executing on the data-sharing server computer system 24 for managing collaborations includes various software modules, including an agent server 140, a directory server 144 that manages a directory 146, an identity server 148, and a connector server 152. The agent server 140 orchestrates the grouping of software systems into collaborations, and the exchange of data between the software systems via the collaboration. The directory 146 managed by the directory server 144 stores static artefacts used by the agent server 140 to create and manage collaborations. The identity server 148 manages user identities in the stateful data-sharing service, and can communicate with an external identity server computer 156 to retrieve authorization information for users via standards, such as Lightweight Directory Access Protocol ("LDAP"). The connector server 152 executes various "connectors". Some connectors communicate with various resource types, such as relational databases or web services. Other connectors are helper applications that perform simple functions like unit conversions.

A set of representative software systems are shown as at least partially executing on the desktop computer 20.

In particular, a first software system includes a customer relationship management ("CRM") client 160 in communication with a CRM database (not shown) over the communications network 28. The CRM client 160 provides access to data in the CRM database 52 that is shared amongst all employees. The CRM client 160 is a native application for the desktop computer 20. Each customer contact's contact information in the CRM database is associated with a customer ID. The CRM client 160 has been customized to communicate with the agent server 140 in order to participate in collaborations.

A second software system includes a project management application 164 for managing customer projects. The project management application 164 has also been customized to communicate with the agent server 140 in order to participate in collaborations. In addition, the corresponding customer ID from the CRM database is entered into the project management application 164 to enable the association of the customer's data in the project management application 164 with the customer's data in the CRM database.

A third software system for providing customer support includes a support view web page 168. The support view web page 168 talks to a web server via the communications network 28 to access support information for customer stored thereby. The support view web page 168 has been customized to communicate with the agent server 140 in order to participate in collaborations. In addition, the corresponding customer ID and a contact ID from the CRM database is entered into the support view web page 168 to enable the association of the customer's and the particular contact's support data stored by the web server with the customer's data in the CRM database.

A fourth software system includes a sales database client 172 for managing customer sales. The sales database client 172 communicates to a sales database via the communications network 28 to access sales data for customers. In addition, the corresponding customer ID from the CRM database is entered into the project management application 164 to enable the association of the customer's data in the project management application 164 with the customer's data in the CRM database. The sales database client 172 communicates with the agent server 140 in order to participate in collaborations.

A fifth software system includes an accounting system client 176 for managing financial accounts. The accounting system client 176 communicates to an accounting system database via the communications network 28 to access financial accounting data for customers. In addition, the corresponding customer ID from the CRM database is entered into the accounting system database to enable the association of the customer's data in the accounting system database with the customer's data in the CRM database. The accounting system client 176 communicates with the agent server 140 in order to participate in collaborations.

The agent server 140 enables these software systems to share data via a collaboration. Each collaboration relates to a task, and software systems used to complete that task are participants in that collaboration. As used hereinafter, it should be understood that "participant" refers to a software system that participates in a collaboration, or a component of a software system that participates in a collaboration on behalf of the software system. As previously noted, software systems can include one or more applications, programs, services, databases, firmware, executed scripts, middleware, sets of functionality available via web pages, etc. that share and/or receive data. It is said that the software system participates in a collaboration even when only a component thereof interacts with the agent server 140. Where such software systems have one or more components that execute on a personal computing device, such as the desktop computer 20, one of these components typically communicates with the agent server 140 on behalf of the software system. These types of software systems are referred to as client-side participants. Client-side participants generally actively initiate communications with the agent server 140 to register in a collaboration. In contrast, server-side participants are components of software systems that are executed remotely on server computers on behalf of users to perform actions and/or access data that a user would otherwise perform through a database client, web browser, etc. Typically, server-side participants are invoked by the agent server 140 when a collaboration in which they are to participate is created.

Collaborations generally include at least one client-side participant that initializes a collaboration, receives some data from a user and/or provides some data and/or feedback to the user.

In the system shown in FIG. 3, the CRM client 160, the project management application 164, the support view web page 168, the sales database client 172, and the accounting system client 176 are all client-side participants in collaborations.

The agent server 140 is responsible for managing collaborations and the participation of various software systems therein for each of a number of users that may be in the process of completing the same task, albeit for their context(s), and/or different tasks. In some cases, a user may be in the process of completing different tasks simultaneously, or even a particular task multiple times simultaneously. To safeguard against accidental access of a first user's data by a second user, the agent server 140 maintains the data shared by each user in separate user spaces. The user spaces are virtual sandboxes that ensure the information of a given user is only available to that user in the presence of their authentication. In addition, the agent server 140 manages a separate collaboration in the corresponding user space for each task that the user is pursuing.

The agent server 140 ensures that the participants share data according to an established set of rules. For example, the agent server 140 ensures that each data item value shared by a participant can be associated with a share definition that includes a semantic description so that its semantics can always be determined. Semantic descriptions allow the agent server 140 to define and then process non-explicit relationships between the data items shared by software systems and data requested by other software systems using ontologies. Semantics and ontologies enable, for example, two different properties like "YearsOld" and "Age" to be equated; even something this simple can require extensive rework without semantic descriptions, especially over a large number of software systems. These declarative semantics enable the software systems to declare the data items they share values for and the data items for which they would like to receive, or "consume", values in a manner that is independent of their internal representation, and allow them to be unambiguously identified. The use of semantics and ontologies allows the agent server 140 to properly determine the relationships between data items and software systems without point-to-point connections established by the software systems themselves or an external integration system.

The agent server 140 includes a query evaluator that evaluates whether there is a change in the state of consume requests registered by software systems. Consume requests are akin to standing queries for values of sets of data as the values become available or are updated. The state of a consume request is determined by whether or not the consume request is satisfied and, if satisfied, the values that satisfied it. A consume request is deemed satisfied when values are available for each shared data item to which the set of data specified by the consume request semantically resolves. Thus, the query evaluator determines that there is a change in the state of a consume request if one or more new values are shared and the consume request is satisfied, or if the consume request becomes unsatisfied as a result of one or more values being removed from the collaboration. Consume requests are defined such that software systems are not notified of new shared values unless values are available for each of the shared data items to which said sets of data specified in the consume request semantically resolve. In this manner, control is afforded to the software systems as to when notifications occur.

The data for which values are desired are described semantically in the consume requests. The query evaluator includes a reasoner module that semantically resolves the data requested in the consume requests to data items for which values have been received, if possible, via their semantic descriptions using ontologies. The reasoner module does this by computing inferences between the semantic description of the requested data and the semantic description of the data items for which values are shared in the collaboration. It will be appreciated that, in some cases, the query evaluator may be unable to resolve the requested data to data items in the collaboration. For example, the requested data may not yet be available as a particular software system type having data items to which the requested data semantically resolves may not have registered yet or has not shared values for these data items yet, or the requested data may simply not match any of the data items defined in the share definitions of the participant definitions for a collaboration. The query evaluator then determines if values for the matched data items have been received by checking the collaboration instance data. The particular query evaluator implemented in this embodiment is from Jena, an open source JAVA framework for building semantic web applications.

The agent server 140 manages the shared data set as it is shared by software systems and then subsequently provided to other software systems. The data shared in a collaboration is stored during the lifetime of the collaboration, or for some shorter specified period, such as the lifetime of a participant, a set period of time, etc. The shared data is stored in a non-permanent manner in volatile storage, such as in RAM 108, a temporary swap file that may be stored in non-volatile storage 120, etc. The agent server 140 does not need a database or other persistence mechanism because, by design, it does not permanently store the information it manages. By not storing the shared data permanently, greater security is afforded to the data shared.

During the lifetime of a collaboration, the agent server 140 logs when data item values are shared or removed from the collaboration, when the state of a consume request changes, and when participants register in and de-register from the collaboration. These logs are maintained in the collaboration.

When a software system submits a participant registration request without identifying the collaboration that it wants to join, the agent server 140 determines a priority for a subset of the collaboration definitions for the software system. In the current implementation, the subset represents the collaboration definitions that specify that the software system can join based on its type. The agent server 140 then selects one of the collaboration definitions at least partially based on the priorities and registers the software system in a collaboration corresponding to the selected collaboration definition.

Further, the agent server 140 determines if a collaboration is unlikely to be of further benefit and should therefore be destroyed. It uses conditions specified in policy statements to determine when to destroy a collaboration.

The agent server 140 is implemented as a JAVA web application deployed on the data-sharing server computer system 24. An administrative user interface of the agent server 140 enables configuration thereof, but most of its functionality is exposed as multi-user web service API via HyperText Transfer Protocol ("HTTP") and Secure HTTP ("HTTPS") that is used during regular operation. The API provides access to collaborations and participants and supports core operations, namely:
 create a collaboration;
 destroy a collaboration;
 register a participant;
 de-register a participant;
 suspend a participant;
 enable notifications for consume requests for a participant;
 share information in the collaboration from a participant;
 remove shared information from the context for a participant; and
 send notification of shared information to a participant.

The directory server 144 maintains information used by the agent server 140 to manage collaborations and the participation of software systems in those collaborations, and by the connector server 152 to configure connectors.

Figure 4:
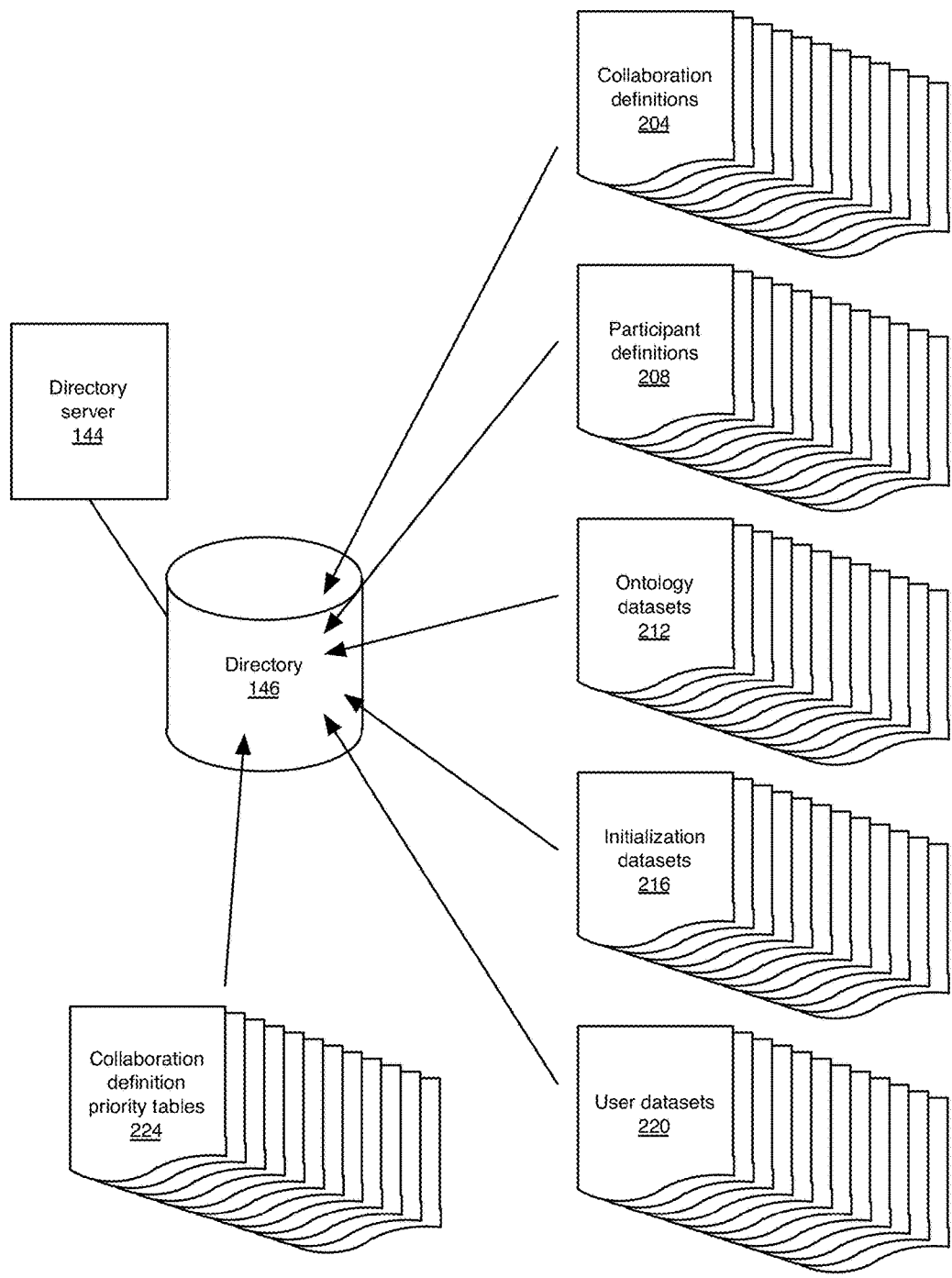
FIG. 4 shows the directory server of the data-sharing server computer system of FIG. 3, together with various artefacts stored in a directory it maintains.

Referring now to FIGS. 3 and 4, the directory server 144 is shown managing the directory 146. The directory 146 stores various static artefacts, including collaboration definitions 204, participant definitions 208, ontology datasets 212, initialization datasets 216, user datasets 220, and collaboration definition priority tables 224. The collaboration definitions 204 and the participant definitions 208 represent collaboration and participant policy statements regarding what can happen in a collaboration and what each participant can do in a collaboration respectively.

Collaboration definitions 204 are used by the agent server 140 to create and manage collaborations. Each collaboration definition 204 delineates a pre-defined type of collaboration, and is set out in Terse RDF Triple Language ("Turtle"); that is, a serialization format, the standard for which is published via the World Wide Web Consortium's ("W3C's") web site for Resource Description Framework ("RDF") graphs. RDF is a metadata data model that is defined via a family of W3C specifications for modelling information conceptually that can be found on their web site. The RDF statements specify the participant definitions 208 for the types of participants allowed in a collaboration of the type defined by the collaboration definition, the initialization datasets 216 that the collaboration is to be populated with at initialization, and the ontology datasets 212 that are to be used in the collaboration.

A collaboration only has capacity for (i.e., allows participation therein by) one participant of each participant type matching the specified participant definitions 208 in the collaboration definition 204 used to create the collaboration. This ensures that two participants of the same type do not provide competing data to the collaboration. The collaboration definitions 204 are identified using a universal resource identifier ("URI") and, likewise, refer to the participant definitions 208, the ontology datasets 212, and the initialization datasets 216 via URIs. The URIs are unique identifiers that identify the collaboration definitions 204, the participant definitions 208, the ontology datasets 212, and the initialization datasets 216 within a scope owned by the author of the software system, for example the domain name system ("DNS") name of the company that authored the component could be used to scope the identifier to that company with a suffix identifying the particular data item being shared.

In addition, a collaboration definition 204 may indicate a maximum number of collaborations that can be created with that collaboration definition for a user. In some cases, it may be desirable to have a user only work on a single instance of a task at any one time. For example, where a collaboration definition is designed to permit sharing of data between two desktop applications for each which only one instance can exist at one time (such as an accounting database client and a human resources client), only one collaboration of that type should exist at one time to ensure that the two applications are registered in the same collaboration. In other cases, it may be desirable to limit the number of collaborations to some number n, such as to avoid errant participants from causing a large number of collaborations of the same type to be created. Setting the maximum number of collaborations that can be created for a user within a collaboration definition to "0" enables an infinite number of collaborations to be created.

A collaboration definition 204 can also specify conditions upon the satisfaction of which a collaboration should be destroyed.

During runtime, the agent server 140 retrieves collaboration definitions 204 from the directory server 144 and uses them to create and initialize collaborations, as will be described below.

Each participant definition 208, like the collaboration definitions 204, is specified in Turtle and includes a set of RDF statements for the participant type, including the participant class, participant configuration information, share definitions, and consume request definitions. The share definitions define what data the participant type is allowed to share. The consume request definitions define what data the participant type is allowed to receive when it is available and/or updated within the scope of the particular task associated with the collaboration. Thus, participant definitions 204 are akin to policy statements that delineate what a participant can and cannot do.

The participant configuration information, the share definitions, and the consume request definitions included in the participant definition 208 are loaded by the agent server 140 from the directory 146 via the directory server 144 when a collaboration is created.

Participants are loosely coupled in collaborations. For this purpose, the details of the participant class, the participant configuration information, consume request definitions and share definitions as specified in each participant definition 208 are only used in the management of that particular participant by the agent server 140, and not shared with other participants of other types. Neither the participant configuration information, the consume request definitions nor the share definitions for participant types form part of the collaboration definition 204 other than by reference to the participant definition 208 that contains them. This enables participant types to be swapped in a collaboration definition 204 without worrying about any binding other than that expressed by their share definitions and consume request definitions.

As noted, each participant definition 208 has a URI. Software systems that participate in collaborations identify themselves using the URI of the corresponding participant definition 208 when registering with the agent server 140.

Additionally, each share definition and consume request definition is identified within a participant definition 208 using a URI.

The participant class indicates whether the participant is a server-side participant or a client-side participant.

The participant configuration information includes a description of the participant type and other desired declarations, enabling the storage of configuration information for software systems in their corresponding participant definitions 208. The participant configuration information can also include a list of URIs for consume request definitions established for the participant definition 208. Participants can get access to the participant configuration information for their participant type by registering a special type of consume request called a directory consume request for it with the agent server 140. Examples of participant configuration information include a name for the participant, a description for the participant, and a URL for a resource or other server computer to connect to.

The share definitions in a participant definition 208 represent the sets of data items allowed to be shared by a participant type. Each share definition delimits and identifies a set of information that the participant type may provide to the collaboration. Each participant type can have zero to many share definitions. The share definitions provide a list of the data items to be shared, including the formal semantic definition for these data items to permit useful matching and discovery of the data items by the reasoner module of the agent server 140, as well as transformation of the data items.

As previously noted, share declarations are uniquely identified by URI. In addition, each data item specified in a share definition has a formal definition that is identified using a URI. Uniqueness across all the software systems enables each use of that data item identifier (i.e., the URI) to reliably identify a data item with the same characteristics. In simple terms, if software system A publishes a value for data item with a URI of http://example.com/2010/C1 and software system B wants to consume data with a semantic description matching that of the data item, it can count on the fact that the data item with the URI http://example.com/2010/C1 from software system A is the expected data.

At runtime, when a participant wants to share data item values, it refers to the URI of a valid share definition specified in the participant definition 208 corresponding to the type of the participant and passes along the values. This limits information shared by the participant to a subset of the information specified in the share definitions set out in the participant definition 208.

As previously noted, consume requests are akin to standing queries for values of shared data items to which the sets of data specified in the consume requests semantically resolve as they become available (thus satisfying the consume requests), are updated while the consume request is satisfied, and/or are removed from the collaboration (thus causing the consume requests to become unsatisfied). In all of these cases, the state of the consume requests change. The consume request definitions specified in the participant definition 208 delimit the consume requests allowed to be registered by a participant. Each consume request definition specifies a standing query for data from the collaboration with sufficient semantics to enable the agent server 140 to semantically resolve the requested data to the values of one or more data items, when available. Each participant type can have zero to many consume request definitions. The consume request definitions in a participant definition 208 for a software system type are standing queries written in the SPARQL Protocol and RDF Query Language ("SPARQL") that is another W3C specification for querying information semantically.

As previously noted, consume request definitions are identified by URIs. When a participant registers with the agent server 140, it provides a list of consume request definition URIs that it wants to be notified for; those URIs should relate to a subset of the consume request definitions defined in the participant definition 208. When a participant provides the URIs of one or more consume request definitions with the participant registration request, it is said that it is providing consume requests.

Consume request definitions can be defined to look for information only from the participant definition 208. These consume requests definitions are referred to as directory consume requests, and consume requests derived from such consume requests are referred to as directory consume requests, as the information being requested is ultimately stored in the participant definition 208 in the directory 146. This enables configuration information used by participants of that type to be stored in the participant definition 208, thereby permitting its central management and removing the need to recode participant types for configuration changes.

Multi-graph consume request definitions can be defined for information from both the participant definition and other data in the collaboration. Multi-graph consume requests can specify a preference for requested data from the collaboration model or the instance data. That is, a multi-graph consume request can specify a query for data in the collaboration model and the instance data, but that data in the instance data overrides the data in the collaboration model. Alternatively, a multi-graph consume request can specify that the data in the collaboration model overrides the data in the instance data.

In the current implementation, each participant definition 208 includes a single primary directory consume request definition, and its URI is designated using a standard naming convention given the participant definition URI. Further, participant definitions 208 can also specify one or more secondary directory consume request definitions.

A participant type can be designed to register a directory consume request for configuration information, and then use the configuration information once received from the agent server 140, enabling a participant to be reconfigured as needed via changes to the configuration information in the participant definition 208. Of note is that changes to the configuration information in the participant definition 208 will only be implemented in collaborations created thereafter and will not affect previously-created collaborations.

In order to support automated discovery of allowable consume requests, participant types can be configured to register with the agent server 140 with a directory consume request for a list of consume request definition URIs from its corresponding participant definition 208, and then re-register with consume requests corresponding to the list of consume request definition URIs found in the participant definition 208. Directory information consume requests are so-called as they specify data that is originally stored in the directory 146.

These artefacts are static as they don't change based on the current context of any user. The directory 146 holds these definitions and, whenever other components of the system need access to this information, they request it from the directory server 144. The definitions can be updated in the directory 146 and immediately have the agent server 140 use the updated definitions for new collaborations.

Ontology datasets 212 provide information about data items and how they are interrelated. The ontology information from the ontology datasets 212 extends the semantics of the participant share definitions and consume request definitions by stating relations between the semantic descriptions of the data items. Using these relations, the reasoner module of the agent server 140 can semantically resolve information requested in consume requests to data item values shared in the collaboration despite mismatches in the literal identifiers of the data specified in the consume request definitions and the data items in the share definitions of the various participants.

Initialization datasets 216 are also specified in Turtle and include a set of RDF statements for data that can be used to populate a collaboration at initialization. The data can include, for example, days of the week, months of the year, number of days in each month, provinces and states, etc.

The directory server 144 can store user-specific information, like the user's name and login credentials, on behalf of the user for resources that are accessed by a participant during a collaboration in user datasets 220. These resources can be web pages, databases, services, etc. The agent server 140 collects login credentials for each site and system from interactions of the user with the site via a participant and stores them in the user dataset 220 maintained for the particular user; that is, the user datasets 220 are associated with identities of the users. The user datasets 220 may also be proactively populated with these login credentials. The user datasets 220 are not referenced by any collaboration definitions 204. Instead, the user dataset 220 corresponding with the identity of the user is retrieved by the agent server 140 from the directory server 144 when creating a collaboration for a user based on user identity available from the user's authentication token.

The directory server 144 maintains a set of collaboration definition priority tables 224. Each collaboration definition priority table 224 is associated with a participant definition 208 and, for each user role, includes a priority value for each collaboration definition that participants of that type can join. In the current implementation, the priority values in the collaboration definition priority table 224 for a particular user role differ for each collaboration definition, thus allowing a determination of relative priority for collaboration definitions for a participant type by user role. Alternatively, a simple priority can be identified for collaboration definitions, thus yielding effective priority values.

Figure 5A:
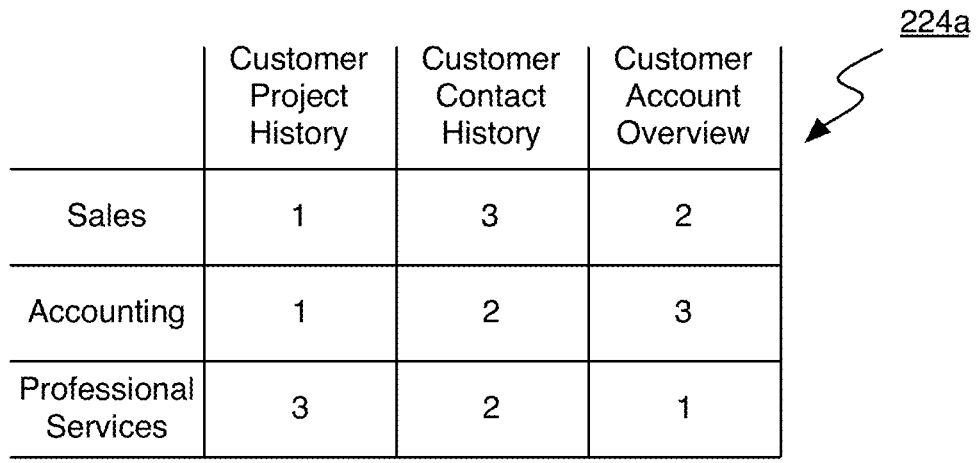
FIGS. 5A and 5B illustrate tables of collaboration definition priority tables used by the data-sharing server computer system of FIGS. 1 to 3.

FIG. 5A illustrates an exemplary collaboration definition priority table 224a for the system shown in FIGS. 1 to 3. The exemplary collaboration definition priority table 224a is defined for a particular participant type, the CRM client 160. As shown, the collaboration definition priority table 224a includes a set of priority values defined for various user roles appearing on separate rows and for collaboration types associated with collaboration definitions in separate columns. The user roles are "Sales", "Accounting", and "Professional Services". The collaboration types are "Customer Project History", "Customer Contact History", and "Customer Account Overview". The "Customer Project History" collaboration type enables the CRM client 160 and the project management application 164 to share data. Selection of a customer in the CRM client 160 shares the customer ID in a collaboration with the project management application 164, which then presents projects associated with that customer. The "Customer Contact History" collaboration type enables the CRM client 160 and the support view web page 168 to share data. Selection of a customer in the CRM client 160 shares the customer ID in a collaboration with the support view web page 168, which then presents the support history associated with that customer. The "Customer Account Overview" collaboration type enables the CRM client 160, the sales database client 172, and the accounting system client 176 to share data. Selection of a customer in the CRM client 160 shares the customer ID in a collaboration with the sales database client 172 and the accounting system client 176, which then present the sales and accounting data, respectively, associated with that customer.

For a user with a role of "Sales", the "Customer Contact History" collaboration type has the highest priority value ("3"), followed by the "Customer Account Overview" collaboration type ("2"), then by the "Customer Project History" collaboration type ("1"). For a user with a role of "Accounting", the "Customer Account Overview" collaboration type has the highest priority value ("3"), followed by the "Customer Contact History" collaboration type ("2"), then by the "Customer Project History" collaboration type ("1"). For a user with a role of "Professional Services", the "Customer Project History" collaboration type has the highest priority value ("3"), followed by the "Customer Contact History" collaboration type ("2"), then by the "Customer Account Overview" collaboration type ("1").

Figure 5B:
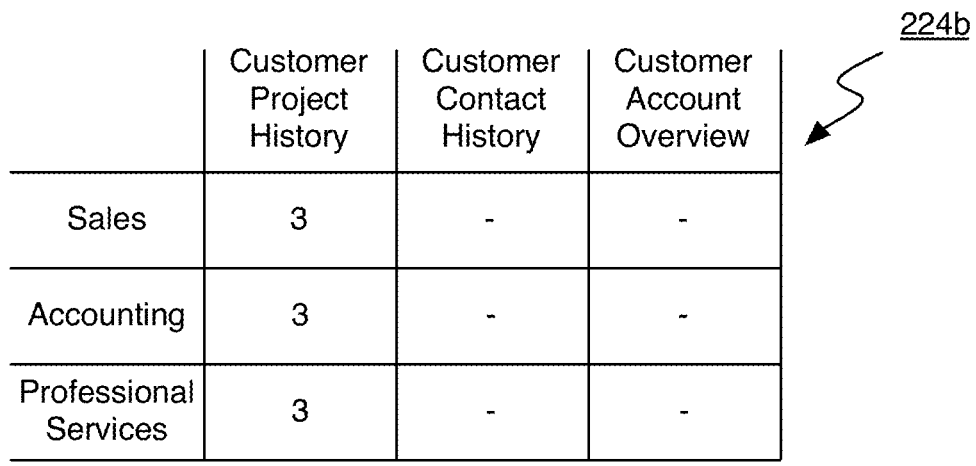

FIG. 5B illustrates another exemplary collaboration definition priority table 224*b* similar to that of FIG. 5A. The exemplary collaboration definition priority table 224*b* is defined for another particular participant type, the project management application 164. The project management application 164 is only permitted to participate in the Customer Project History collaboration. As a result, regardless of the role of the user, the "Customer Project History" collaboration type has the highest and only priority value ("3"), and the other two collaboration types, "Customer Contact History" and "Customer Account Overview", are provided with a null priority value, indicating that the participant type cannot join collaborations of these types.

The directory server 144 has a minimal administrative user interface for facilitating access to and management of the artefacts, but most of the capability is exposed as a HTTP and HTTPS API that affords flexibility in its location. The API provides access to the artefacts and supports operations like create, update and delete, as well as more complex logical operations like adding a participant type to a collaboration definition.

The identity server 148 acts as an identity gateway and may manage the identity of users in the system, including any roles that the users have. These identities are used by the agent server 140, the directory server 144 and the connector server 152. The agent server 140 reviews the roles the user has, as provided by the identity server 148, to determine what collaboration to launch for a user when a software system being used by the user attempts to register with the agent server 140.

There are a number of ways in which software systems can identify themselves with a user. Software systems that execute at least partially on a user's personal computing device can be configured with user credentials, can retrieve these user credentials from another location or directory, or can obtain them from the user as part of the initialization process. When one software system provides the user credentials to the agent server 140, the agent server 140 relays them to the identity server 148, which generates and returns a user token associated with the identity of the user to the software system to the agent server 140 if the user is authenticated. The agent server 140 provides the user token to the software system, which can then share this user token with other software systems on the personal computing device. Alternatively, other software systems can be configured with the same user credentials and use the same process to receive a user token corresponding to the same identity. The software systems of the stateful data-sharing service can then use these user tokens to assert the identity of the user with various components of the stateful data-sharing service.

The connector server 152 executes "connectors" that provide access to resources. Each connector is a generally stateless service that provides functionality to interact with a particular resource type, such as an SQL database or a REST server, or to perform a particular type of translation. Connectors are interacted with via server-side participants known as proxy participants. Proxy participants are instantiated and registered in a collaboration by the agent server 140 when the proxy participant is identified as a participant in the collaboration definition 204. When a consume request is satisfied for a proxy participant, the agent server 140 notifies the proxy participant with the following information:

the user token;
a participant token generated by the agent server 140 that uniquely identifies the connector participant;
the participant definition URI;
the URI of the consume request definition that was satisfied;
the data item values satisfying the consume request; and
the transaction ID, if any.

In response, the proxy participant passes this information, except for the participant token and the transaction ID, to the appropriate connector server 152. The connector does not need the participant token as it does not need to know which collaboration it is participating in or for what transaction, and merely performs the action requested by the proxy participant as long as the identity and the user role associated with the identity have the appropriate rights to do so.

Upon receiving the information from the proxy participant, the connector server 152 requests the consume request definition corresponding to the participant URI and consume request URI from the directory server 144. The consume request definitions include the URL for the resource to be connected to, the syntax of the message to be sent to the resource, and any required parameters for such communications. In many cases, consume request definitions for proxy participants involve retrieving data from a resource. For example, data item values from a collaboration can be used to generate a structured query language ("SQL") query to a database that returns one or more values. In such cases, a share definition associated with the consume request definition in the participant definition 208 is returned by the directory server 144 with the consume request definition.

The connector confirms that it has the right to perform the requested action on behalf of the identity and user role associated with the identity and then performs the requested action. If there is an associated share definition, the connector provides the data item values for the share definition, together with the share definition URI, to the proxy participant for sharing with the collaboration.

Upon providing any results back to the proxy participant, the connector server 152 and the connector retain no knowledge of the data exchange; i.e., they are stateless. The proxy participant can then share the resulting data item values, if any, from the connector with the agent server 140 using the share definition URI and the transaction ID, if any.

When the agent server 140 destroys a collaboration, it also destroys the proxy participants registered in that collaboration.

The data consumed and shared by connectors is tightly restricted by the consume request definitions and share definitions set out in the corresponding participant definitions 208. Thus, the connectors will not share or consume data unless explicitly specified.

Connector types include, but are not limited to, database connectors, REpresentational State Transfer ("REST") connectors, terminal services connectors, web connectors, content connectors, and persist connectors.

Database connectors enable the exposing of data in a database in a collaboration. In response to receiving the above-noted information from the proxy participant, database connectors generate and execute database queries on or writes data to the database 52 via the database server computer 24. In the case of a database query, database connectors return the results to the proxy participant that shares them with the collaboration. Thus, as new data forming part of the basis for a query is added to the collaboration, the data is passed to the database connector, which forms a query or write message sent to the database server computer 24, and the collaboration is further enhanced by the corresponding new query results.

REST connectors enable web services data to be exposed in a collaboration. In response to receiving the above-noted information from the proxy participant, REST connectors generate and transmit HTTP Get requests to a REST server for data accessed via the REST server. After receiving data back from the REST server, REST connectors return any results to the proxy participant that shares them with the collaboration. Alternately, the consume request definition may direct REST connectors to generate and transmit HTTP POST requests to a REST server to cause a change in the data maintained via the REST server.

Terminal services connectors expose terminal services data in a collaboration. In response to receiving the above-noted information from the proxy participant, terminal services connectors generate and transmit terminal commands to a terminal server. Any data returned by the terminal server can be returned by the terminal services connector to the collaboration via the proxy participant.

Web connectors enable data exchange with web applications that are not designed to natively interact with collaborations. In response to receiving the above-noted information from the proxy participant, web connectors complete a request for a web page, either by completing a form or by generating a request for a web page with a Universal Resource Locator ("URL") constructed using the data. The web connector then returns data from the resultant web page to the proxy participant so that it can be shared in the collaboration.

Content connectors expose file contents in a collaboration. They are used to access content from applications such as Microsoft Excel or flat file text formats. In response to receiving the above-noted information from the proxy participant, content connectors generate read or write requests for a data source. Where data is read by the content connector, it is passed back to the associated proxy participant for sharing in the collaboration.

Persist connectors enable the persistence of data from the collaboration beyond the lifetime of the collaboration where explicitly configured to do so. The agent server 140 stores data shared in a collaboration in a volatile manner to afford it security. In some scenarios, however, it can be desired to persist data across collaborations for a user. For example, it can be desirable to store an audit trail of the information available in the collaboration instance data across the lifetime of multiple collaborations. In response to receiving the above-noted information from the proxy participant, persist connectors store specified data persistently or retrieve data stored in RDF statements in a datastore it maintains. Alternatively, this data could be stored by the persist connectors in the directory 146. The consume requests for the persist connectors are designed so that only the data that should persist beyond the lifetime of a collaboration does.

Additionally, the connector server 152 executes "transformers" that perform translations on the data. Transformers are similar to connectors and are invoked by the agent server 140 in a similar manner, but do not connect to other resources. Transformers transform data in a collaboration from one form to another. For example, transformers can perform a simple transformation on data provided by a proxy participant and then provide the transformed data back to the proxy participant to share in the collaboration for other participants to consume. A first example of a data transformation is the conversion of data values from one unit of measure to another. Another example of a transformation performed by transformation connectors is the reformatting of dates from one format to another.

Each connector (or transformer) and its associated proxy participant, if any, when configured using a participant definition 208, and the resource(s) and/or other server computer(s) it connects to form a software system that can participate in a collaboration.

Collaboration and Participant Life Cycles

The life cycles of collaborations and participants are intertwined. Before a participant joins a collaboration, it neither adds value to others nor is its own data enriched. Likewise, a collaboration without participants can neither aggregate new information nor share any information that it might have previously obtained from a participant that is no longer active. As a result, collaborations are created when a participant wants to participate.

Figure 6:
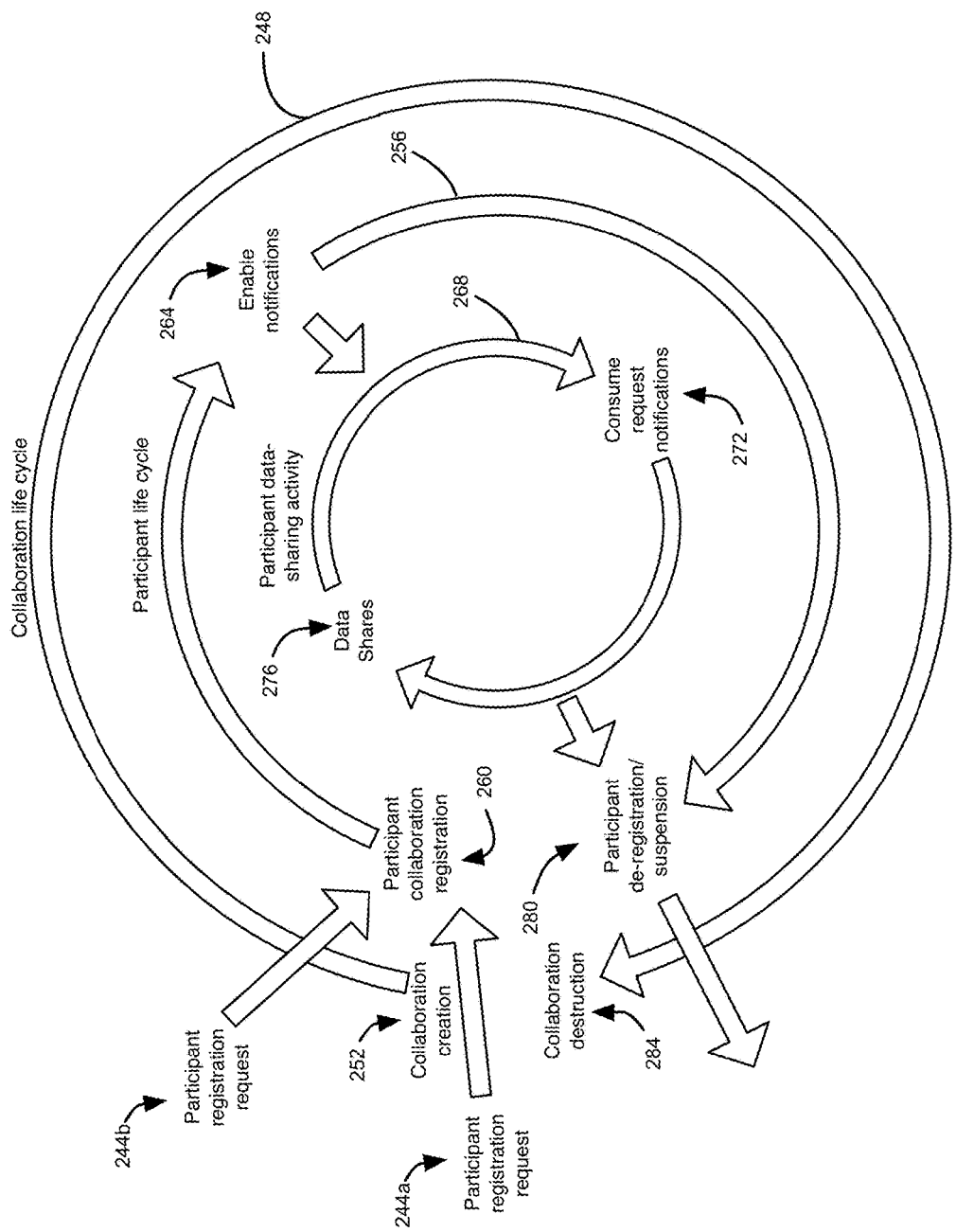
FIG. 6 shows the general lifecycle for a collaboration in the system of FIGS. 1 to 3.
Figure 7A:
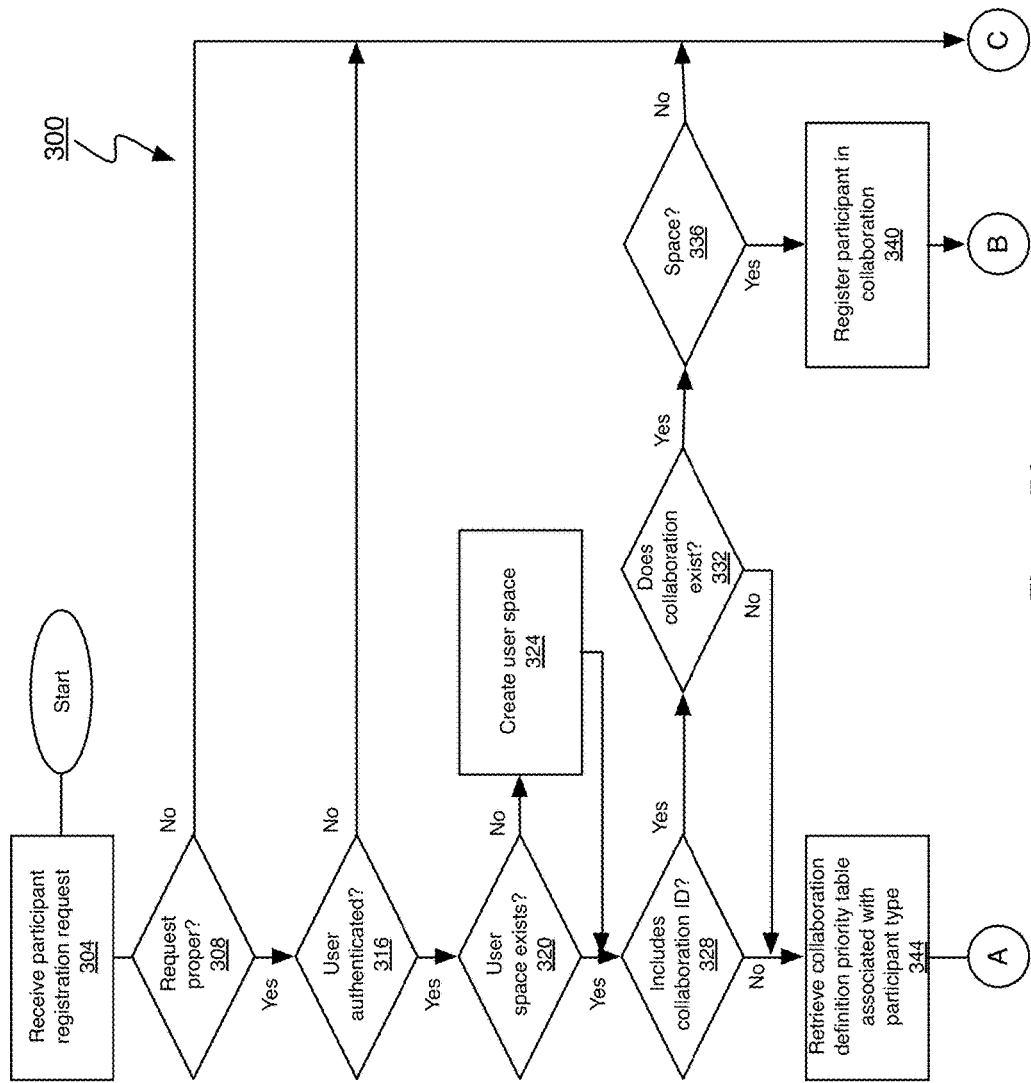
FIGS. 7A and 7B present a flow chart of the general method of receiving a participant registration request and registering the participant in a collaboration employed by the data-sharing server computer system of FIGS. 1 to 3.
Figure 7B:
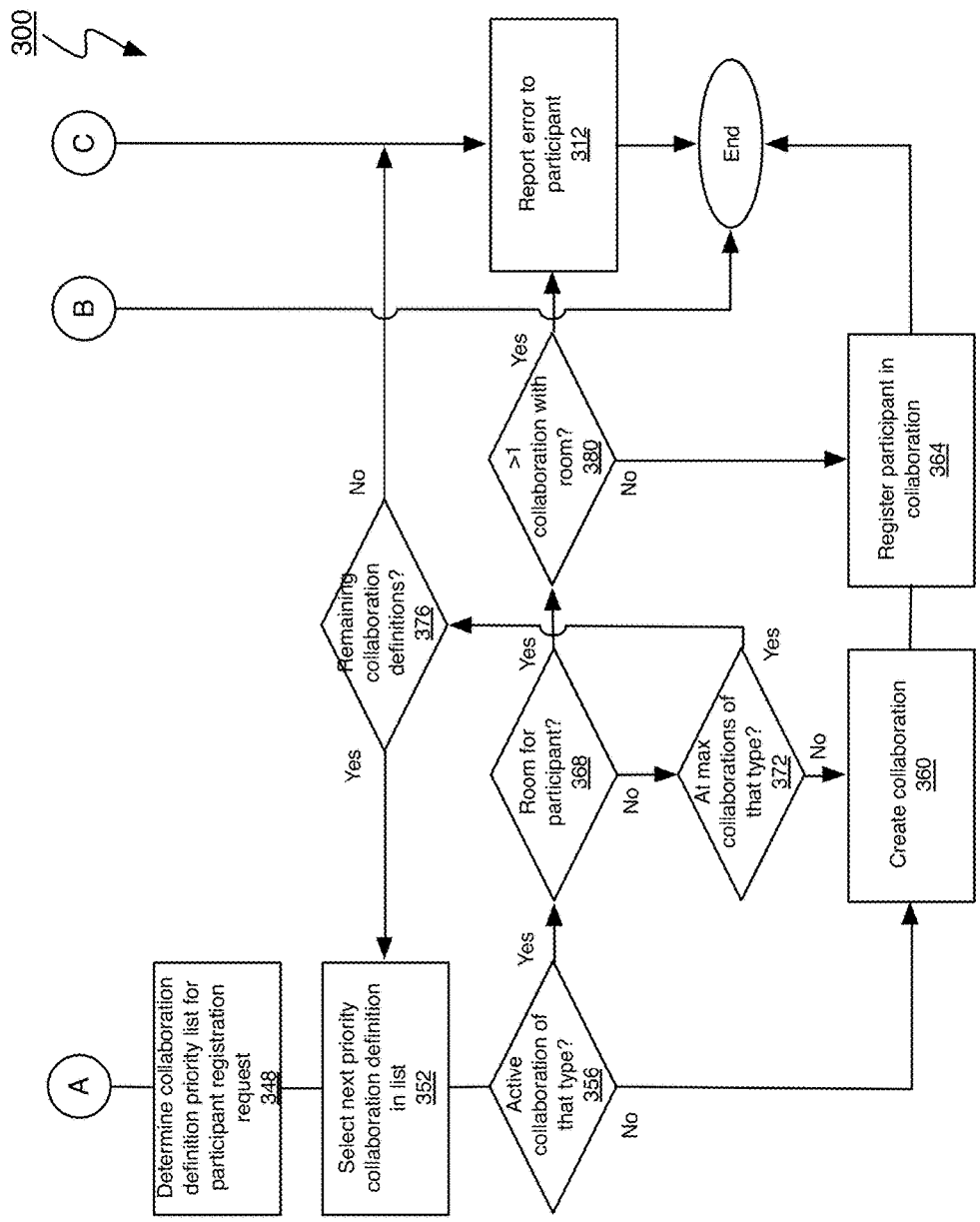
Figure 8:
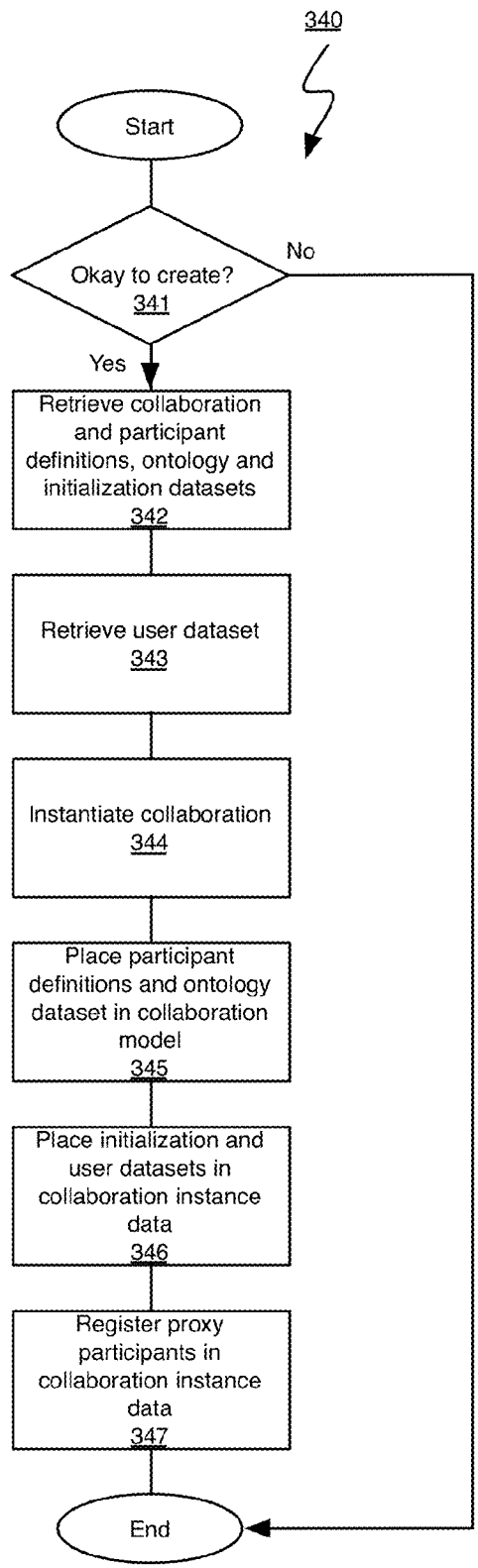
FIG. 8 is a flow chart of the method of creating a collaboration employed by the data-sharing server computer system of FIGS. 1 to 3.

Referring now to FIGS. 3, 4, and 6, the life cycles of collaborations and participants are illustrated. A pair of participant registration requests 244a and 244b are shown. The agent server 140 determines what type of collaboration the participant that transmitted the participant registration request should join. If a collaboration of the desired collaboration type does not exist or does not have space for the participant, such as is the case for participant registration request 244a, the agent server 140 creates a collaboration, should certain conditions be met. If, instead, a collaboration of the desired collaboration type exists and has capacity for the participant that transmitted the participant registration request, the participant is registered in that collaboration (see participant registration request 244b).

A collaboration life cycle 248 is shown, and begins with a collaboration creation 248 effected by the agent server 140 in response to receiving the participant registration request 244a.

Participant life cycles 256 within the collaboration life cycle 248 commence with a participant collaboration registration 260. As software systems configured to participate in the collaboration generate participant registration requests, the agent server 140 registers these participants in an existing or a newly-created collaboration. The registration requests received from the software systems include consume requests in the form of identifiers of the consume request definitions from the corresponding participant definitions 208 for the sets of data item values that the software system wishes to receive updates for. The participant may be configured to request to commence receiving notifications of updates to sets of data item values in the collaboration matching its consume request(s) via an enable notifications request 264 either immediately or at a later time. In some cases, a participant may be configured to delay receiving notifications of data item values as they become available (thus causing a change in state of its consume requests), are updated while the consume request is satisfied, and/or are removed from the collaboration (thus causing the consume requests to become unsatisfied) until the participant has completed its initialization.

Once the enable notifications request 264 from a participant has been received, the participant data-sharing activity 268 commences. When the agent server 140 processes the enable notifications request 264, it evaluates all consume requests registered for the participant to determine whether the state of a consume request has changed. If the satisfaction state of any consume request has changed, or if the values that satisfy a consume request change, the agent server 140 flags the consume request for notification as its state has changed. Additionally, when data item values are received by the agent server 140 from any participant and updated in the collaboration instance data, the agent server 140 determines which registered consume requests, if any, have states that have changed and flags these consume requests for notification. Participants poll the agent server 140 regularly for consume request notifications. When the agent server 140 receives this poll message, it replies with an identification of the registered consume requests that have previously been noted as having undergone state changes via a consume request notification 272. Upon receiving the consume request notification 272, the participant generates a request for the data item values identified as updated in the consume request notification 272 and is provided these values by the agent server 140. If the consume request notification was triggered as a result of the consume request becoming unsatisfied, the agent server 140 provides a notice of the consume request's state to the participant instead of the values. During the course of participant data-sharing activity 268, the participant can provide data to the collaboration via data shares 276. The pattern of data shares 276 and consume request notifications 272 can vary entirely from participant to participant. Participants may be configured to only share data, to only consume data or to both share and consume data. It will be understood that the data-sharing activity of one participant can impact the pattern of consume request notifications for another participant.

The participant life cycle 256, and thus the participant data-sharing activity 268, can end in a number of manners, including the de-registration of the participant in the collaboration via a de-registration or suspension request generated by the participant, or the destruction of the collaboration. A participant can generate a de-registration request or suspension request 280 to indicate that it would like to permanently or temporarily stop participating in the collaboration. The agent server 140 receives polls from participants regularly or intermittently to check if there are updated values they would like to receive. If the agent server 140 has not received a poll from a participant within a specified period of time, it can suspend and/or de-register the participant. Where a participant has been suspended, consume request notifications 272 are halted until the participant becomes active again via a participant collaboration registration 260. During this period of participant suspension, the agent server 140 continues to determine which consume requests for the participant have undergone state changes, and flags these consume requests. Upon re-registration of the suspended participant, the agent server 140 notifies the participant of the consume requests that have undergone state changes since suspension. Where a participant has de-registered and then registers again via a participant collaboration registration 260, the agent server 140 treats the participant as if the participant never previously participated and evaluates all consume requests for the participant to determine if any have undergone state changes. After a software system has registered, it may share data in the collaboration. The data to be shared may be generated by the software system independent of data received from a collaboration as part of a new transaction, or may be generated in response to receiving data from a collaboration and form part of that existing transaction.

Collaboration destruction 284 is effected by the agent server 140 upon determining that the collaboration is unlikely to provide further benefit or when the agent server 140 receives an explicit instruction to do so, such as from, for example, a participant. For example, where there has been no data-sharing activity in the collaboration for a period of time, or where there are no remaining participants registered in the collaboration, the agent server 140 may destroy the collaboration.

Client-side Participant Registration

The method 300 of registering client-side participants in collaborations by the agent server 140 will now be described with reference to FIGS. 1 to 8. Client-side participants are generally initialized on a personal computing device and attempt to register with the agent server 140. Upon receiving a participant registration request from a participant, the agent server 140 determines the type of collaboration that the participant should join and creates one, if one is not available to join and others are permitted. The agent server 140 then registers the participant in the collaboration. Server-side participants are, instead, invoked by the agent server 140 as previously described.

The method 300 commences with the receipt of a participant registration request (304). A software system component that acts as a participant can generate a participant registration request sent to the agent server 140 at launch or at some later time. The participant registration request includes:

the user token;
the URI of the participant definition 208 corresponding to the participant requesting registration;
the URI of any consume request definitions listed in the participant definition identifying what sets of data items the participant would like to receive when the state of the consume request changes; and
optionally, a collaboration ID.

Participants are configured with knowledge of the corresponding participant definition URI. The consume requests provided by the participant in the participant registration request, as specified by the consume request definition URIs, should be subsets of the consume request definitions set out in the corresponding participant definition 208. While the participant definition 208 delineates what data items participants of that type are allowed to share and consume, the participants may actually be configured to share and/or consume a subset of the data items that it is permitted to share and/or consume.

The collaboration ID can be provided with a participant registration request. For example, where it is desired to have two participants join the same collaboration, one approach to effecting this is by either by having a first participant generate a collaboration ID, provide it with the participant registration request and share it with other participants, or by sharing the collaboration ID received by the first participant upon registration with other participants.

Upon receipt of the participant registration request, the agent server 140 determines if the request is proper (308). If the agent server 140 determines that the participant definition URI provided in the participant registration request does not correspond with a participant definition 208 in the directory 146, the agent server 140 determines that the participant registration request is improper. Further, if the agent server 140 determines that the consume request definition URIs specified in the participant registration request do not match ones in the corresponding participant definition 208, the agent server 140 determines that the participant registration request is improper. If the agent server 140 determines that the participant registration request is improper, the participant registration request is discarded, and the agent server 140 reports an error to the participant (312), after which the method 300 ends.

Upon validating the participant registration request, the agent server 140 authenticates the user (316). The agent server 140 passes the user token it receives with the participant registration request to the identity server 148. In response, the identity server 148 either confirms or rejects the authenticity of the user to the agent server 140. If the user is not authenticated by the identity server 148 at 316, the participant registration request is discarded and the method 300 ends. If, instead, the user is authenticated at 316, the agent server 140 determines if it is managing a user space for the user (320). The agent server 140 maintains user spaces for each user that has ever had an active collaboration. These user spaces are tied to the identities of the users managed by the identity server 148. If the agent server 140 is not yet managing a user space on behalf of the user, the agent server 140 creates a user space for the user (324).

The agent server 140 then determines if the participant registration request includes a collaboration ID (328). If the participant registration request includes a collaboration ID, the agent server 140 determines if an active collaboration having the collaboration ID exists (332). If an active collaboration having the collaboration ID exists, the agent server 140 determines if the participant can be registered in the collaboration (336). If the collaboration already has a participant of the same type as the participant that generated the participant registration request, then the participant cannot be registered therein. If this is the case, the agent server 140 reports an error to the participant at 312, after which the method 300 ends. If, instead, the participant can be registered in the specific collaboration, the agent server 140 registers the participant therein (340), after which the method 300 ends.

If the participant registration request is found not to include a collaboration ID at 328, or if a collaboration with the specified collaboration ID is found not to exist at 332, then the agent server 140 retrieves the collaboration definition priority table 224 associated with the participant (344). The directory server 144 maintains a collaboration definition priority table 224 for each participant definition. The participant registration request identifies the participant definition associated with the participant that generated the request. The agent server 140 uses this information to retrieve the corresponding collaboration definition priority table 224.

The agent server 140 then determines a collaboration definition priority list for the participant registration request (348). In order to do so, the agent server 140 communicates the user token to the identity server 148 to determine the user role assigned to the identity of the user associated with the user token. Upon receiving the user role from the identity server 148, the agent server 140 looks at the priority values for each collaboration type in the collaboration definition priority table 224 for the user role provided by the identity server 148. The agent server 140 then creates a collaboration definition priority list by ordering the collaboration definitions in the collaboration definition priority table based on the priority values for the user role. This role-based prioritization allows participants based on the same participant definition to fulfill different roles based entirely on the user job function. This lowers the learning curve for users as the system adapts to them automatically.

Upon identifying the collaboration definition priority list for the participant, the agent server 140 selects the next priority collaboration definition in the collaboration definition priority list (352). The agent server 140 selects the collaboration definition in the collaboration definition priority list with the highest priority that hasn't been analyzed yet. Upon selecting a collaboration definition from the collaboration definition priority list, the agent server 140 determines if an active collaboration established using the selected collaboration definition exists (356). If there isn't an active collaboration established using the selected collaboration definition, then the agent server 140 uses the selected collaboration definition to create a collaboration (360). Upon creation of the collaboration, the agent server 140 registers the participant that generated the participant registration request in the created collaboration (364). Upon registration of the participant in the collaboration, the method 300 ends.

If, instead, the agent server 140 determines at 356 that there is at least one active collaboration established using the collaboration definition selected at 352, the agent server 140 determines if the participant is able to be registered in at least one of the collaborations (368). That is, the agent server 140 determines if one or more of the collaborations established using the selected collaboration definition does not yet have a participant of the same type as the participant that generated the participant registration request registered therein. If the participant that generated the participant registration request cannot be registered in any of the active collaborations established using the selected collaboration definition, the agent server 140 determines if another collaboration can be created using the selected collaboration definition (372). The agent server 140 examines the selected collaboration definition 204 to determine if a maximum number of active collaborations has been specified therein. If the number of active collaborations established using the selected collaboration definition 204 js below the maximum number of collaborations specified in the collaboration definition 204, the agent server 140 creates a collaboration using the selected collaboration definition at 360 and registers the participant in the collaboration at 364, after which the method 300 is complete.

Alternatively, if the number of active collaborations established using the selected collaboration definition 204 has reached the maximum number of collaborations specified in the collaboration definition 204, then the agent server 140 determines if there are remaining collaboration definitions 204 in the collaboration definition priority list (376). If there are, the agent server 140 selects the next priority collaboration definition 204 in the list at 352 and determines if it can register the participant in a collaboration of that type.

If the agent server 140 determines at 368 that the participant can be registered in at least one active collaboration established using the selected collaboration definition 204, the agent server 140 determines if there is more than one active collaboration established using the selected collaboration definition 204 in which the participant can be registered (380). If there is only one, the agent server 140 registers the participant that generated the participant registration request in the collaboration at 364, after which the method 300 ends. If there is more than one, the agent server 140 reports an error to the participant at 312, after which the method 300 ends.

Collaboration Creation

The method 340 of creating a collaboration will be described with reference to FIGS. 1 to 4 and 6 to 8. This method 340 is invoked when the agent server 140 determines that it needs to create a collaboration of a certain type upon receiving a participant registration request. The agent server 140 first determines if creation of the collaboration is possible (341). In order for the agent server 140 to create a collaboration, a number of conditions must be met. The directory server 144 must be responding to communications from the agent server 140. A collaboration definition 204 having the collaboration definition URI identified by the agent server 140 as having the highest priority value for the participant registration request must exist in the directory 146. If any of these conditions are not met, then the method 340 ends.

If, instead, the agent server 140 determines that creation of the collaboration is possible at 341, it sends a request via HTTPS to the directory server 144 to retrieve the collaboration definition 204 identified by the collaboration definition URI it identified as having the highest priority value, and referenced artefacts (342). The directory server 144 retrieves the specified collaboration definition 204 from the directory 146 and parses it to determine what participant definitions 208, ontology datasets 212, and initialization datasets 216 are referred to therein. The collaboration definition 204 specifies these artefacts by URI. The directory server 144 then retrieves each of these additional artefacts and returns the collaboration definition 204, as well as the referenced participant definitions 208, ontology datasets 212 and initialization datasets 216, back to the agent server 140. The agent server 140 then requests the user dataset 220 that contains user-specific data, such as the user's name and login credentials for services accessed by the user in interacting with various participants, from the directory server 144 (343). The directory server 144 retrieves the user dataset 220 from the directory 146 and returns it to the agent server 140.

Upon retrieving all of the artefacts and user data associated with the collaboration, the agent server 140 instantiates the collaboration (344). The agent server 140 maintains the collaboration in volatile storage, such as RAM 108 and/or a swap file, so that none of the information therein is stored persistently unless explicitly specified. A unique identifier for the collaboration, referred to as the collaboration ID, is generated for the collaboration by the agent server 140 if it was not provided with the collaboration creation request. The agent server 140 then places the participant definitions 208 and the ontology datasets 212 in the collaboration as a collaboration model (345). The collaboration model stores what is referred to as directory information; that is, information that is retrieved from the directory 146. The collaboration model serves as a policy description of what data the participants can and cannot share and request, and provides configuration information for the participants and collaboration. Further, the ontology information from the ontology datasets 212 extends the semantics of the participant share definitions and consume request definitions, enabling the reasoner module of the agent server 140 to semantically resolve information requested in consume requests to data items shared in the collaboration. The agent server 140 generates a graph data structure definition in the collaboration model from the collaboration definition 204, and the share definitions, consume request definitions, and participant configuration information in the participant definitions 208 using the ontology datasets 212.

Once the information model for the collaboration is complete, the agent server 140 places the initialization datasets 216 and the user dataset 220 into the instance data of the collaboration (346). The instance data represents data that can change during the lifetime of a collaboration. As previously noted, the initialization datasets 216 contain parameters used within collaborations, such as the number of days in each month, the names of provinces and states, etc. The user dataset 220 contains login credentials and other user-specific information, such as a name.

Upon instantiating the collaboration model and instance data, the agent server 140 registers any proxy participants in the collaboration instance data (347). If there are proxy participants specified for the collaboration, as identified by the participant definitions 208 referenced in the collaboration definition 204, the agent server 140 registers the proxy participants in the collaboration instance data. Upon registering any proxy participants, the method 340 of creating a collaboration is complete.

Figure 9:
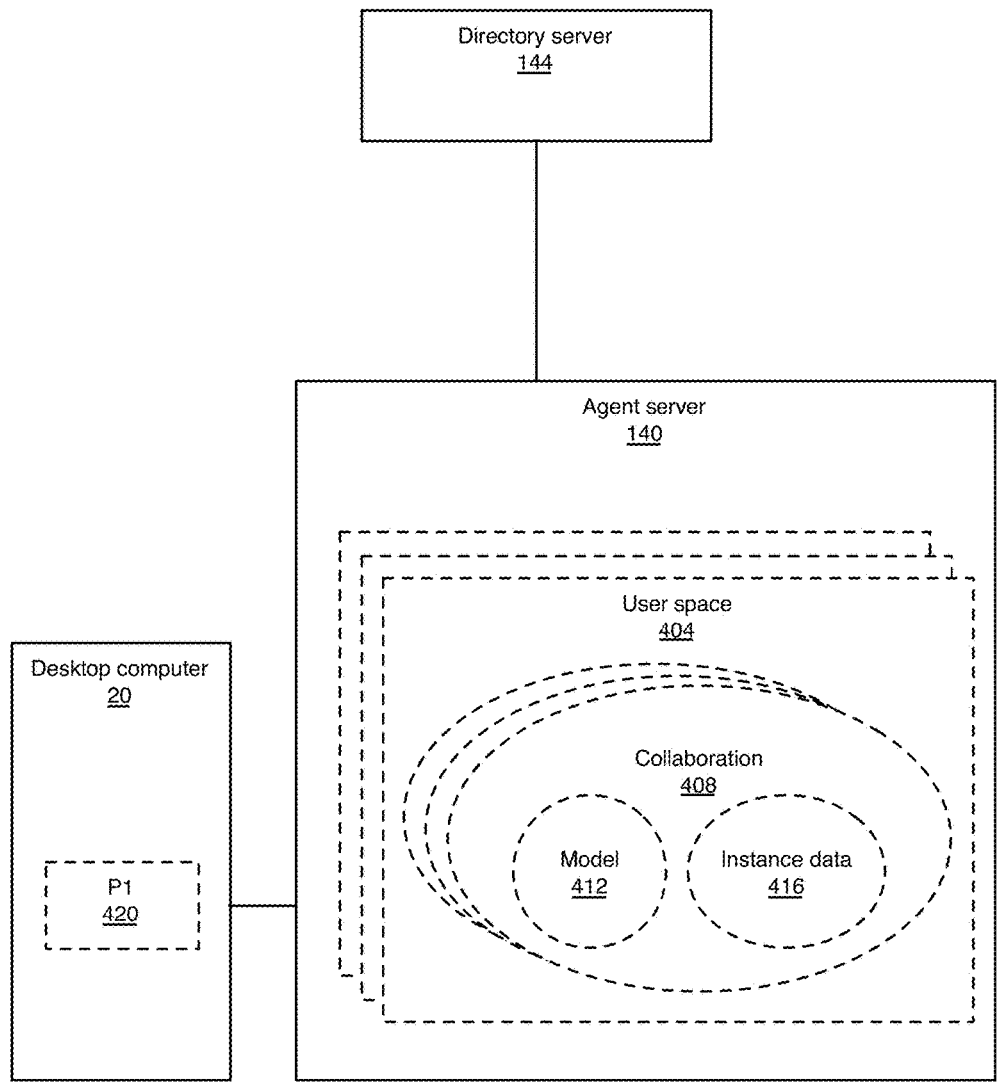
FIG. 9 illustrates the logical creation of a collaboration by the data-sharing server computer system of FIGS. 1 to 3.

FIG. 9 shows the agent server 140 managing a number of user spaces 404 in virtual memory spaces that are isolated from each other to avoid cross-contamination of data between users. Within each user space 404, the agent server 140 can maintain one or more collaborations 408 created via method 300. Each collaboration 408 contains a collaboration model 412 and instance data 416. The collaboration model 412 contains information about the participant types allowed to join the collaboration, the participant configuration information, the share definitions and consume request definitions for each participant type, and the ontology sets that are employed to resolve consume request definitions to data items in the share definitions from the corresponding collaboration definition. The instance data 416 contains a list of currently registered participants, initialization data, user data such as name and login credentials, log files for activity in the collaboration, and any data item values shared by any participant during the life of the collaboration.

During the course of management of a collaboration, the agent server 140 logs activities such as the registration and de-registration of participants, the sharing, withdrawal, and expiry of data, and the satisfaction and other changes in state of consume requests.

The instance data 416 is maintained internally and includes a rich semantic model based on RDF triples using the collaboration model 412 and any associated ontology. Additionally, participants registered in the collaboration 408, as well as their consume requests, are registered in the instance data 416.

Figure 10:
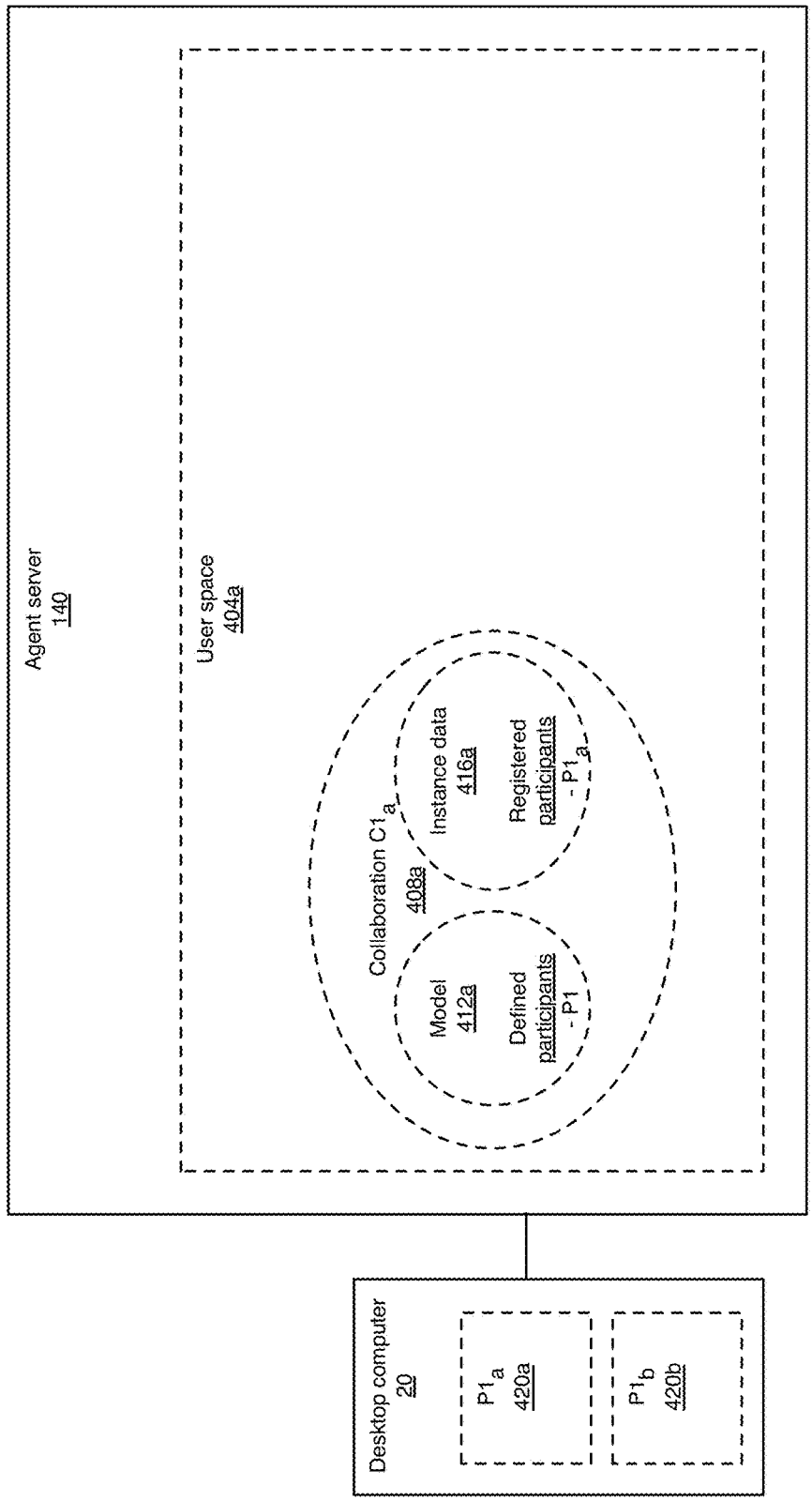
FIG. 10 shows the system of FIG. 3 wherein the data-sharing server computer system manages a collaboration for a first software system when a second software system requests to participate in a collaboration.

FIG. 10 illustrates two participants, $P1_a$ 420a and $P1_b$ 420b, of the same participant type P1 executing on the desktop computer 20 and in communication with the agent server 140. Participant $P1_a$ 420a has previously registered with the agent server 140, and participant $P1_b$ 420b has just been started up. As a result of the previous registration of participant $P1_a$ 420a, the agent server 140 has created a user space 404a and a collaboration C1, 408a within it. The type C1 of the collaboration C1, 408a was selected by the agent server 140 based on the type of the participant $P1_a$ 420a and the role of the user of the desktop computer 20. As can be seen, the model 412a of the collaboration C1, 408a indicates that a participant of the type P1 may be registered therein. Further, the participant $P1_a$ 420a has been registered in the instance data 416a of the collaboration C1, 408a.

Upon start up of the participant $P1_b$ 420b, it sends a participant registration request to the agent server 140. The agent server 140 retrieves the collaboration definition priority table 224 at 328 and determines at 332 that the participant $P1_b$ 420b should join a collaboration of the type C1, the same type of the previously-created collaboration C1, 408a. This is because participant $P1_a$ 420a and participant $P1_b$ 420b are of the same participant type P1 and are operated by the same user with the same role. At 336, the agent server 140 determines that there are no active collaborations of the determined type C1 that have space for the participant $P1_b$ 420b. As can be seen, while collaboration C1, 408a is the correct collaboration type (C1), it already has participant $P1_a$ 420a registered therein. As a result, the agent server 140 creates a new collaboration of the type C1 at 340.

Figure 11:
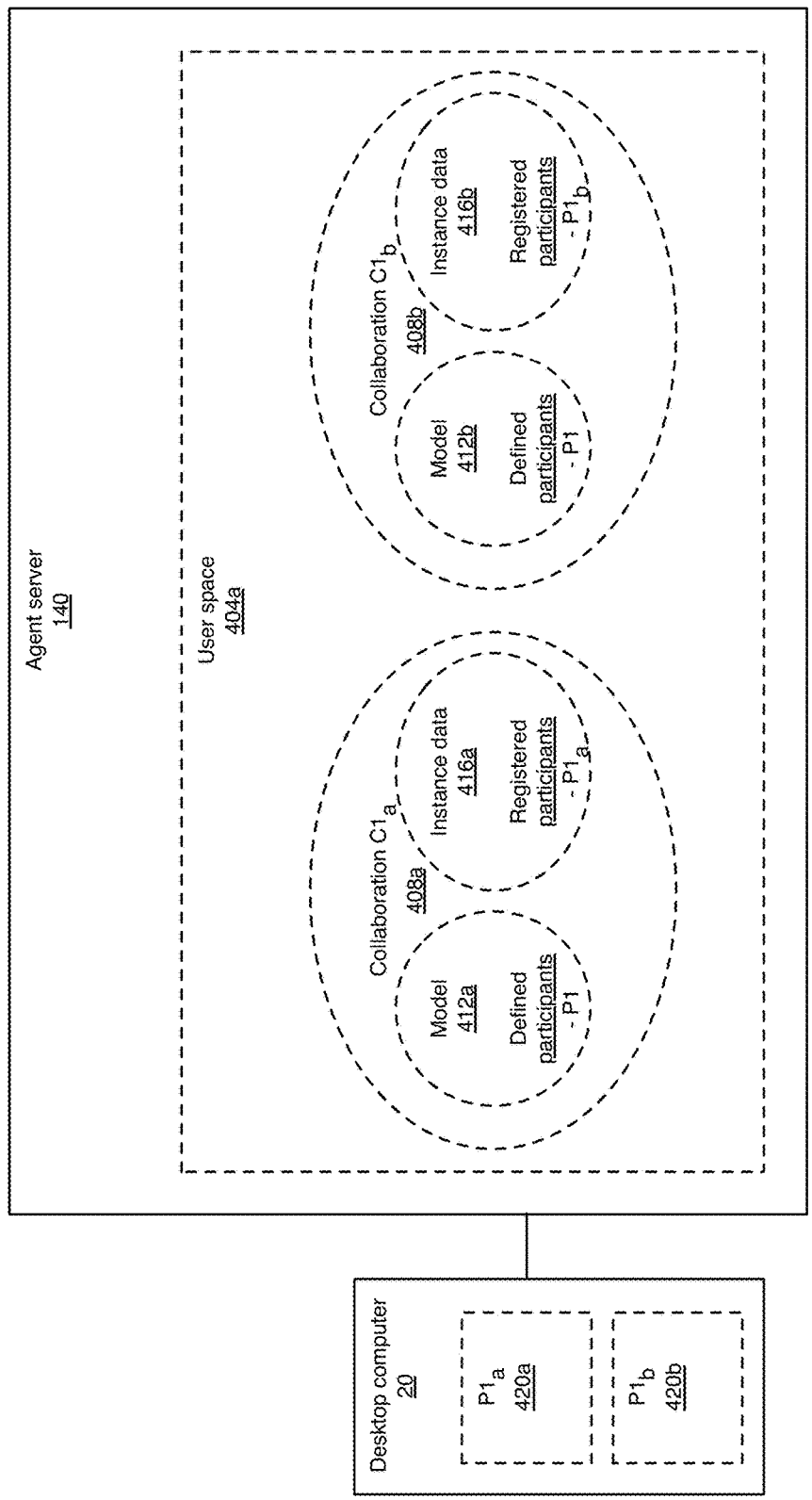
FIG. 11 shows the system of FIG. 10 after the data-sharing server computer system has created a collaboration for the second software system and registered it therein.

FIG. 11 illustrates the user space 404a after the creation of the second collaboration $C1_b$ 408b by the agent server 140 at 340 and registration of the participant $P1_b$ 420b therein at 360. Further, the agent server 140 instantiates the consume request definitions from the collaboration model for the consume request definition URIs specified in the participant registration request from the participant $P1_b$ 420b. The agent server 140 then generates a participant token and records the association between the participant token and the participant ID of the particular participant and the collaboration ID of the collaboration into which the participant has been registered. The agent server 140 returns the participant token to the participant for future use. The participant token can be re-provided by the participant to the agent server 140 with further communications to enable the agent server 140 to look up who the participant is and what collaboration the participant is participating in. Upon placing the participant in the collaboration, the method 300 ends.

A participant will not receive any consume request notifications regarding updated data item values in the collaboration from the agent server 140 until it sends an enable notifications request to the agent server 140. This gives the participant time to finish its initialization before it starts receiving notifications from the agent server 140. Upon receiving an enable notifications request from a participant, the agent server 140 determines which, if any, of the participant's consume requests have undergone state changes and continually does so upon receipt of updates to data item values. Further, the participant regularly polls the agent server 140 to determine if the agent server 140 has flagged any consume requests as having undergone a state change. Continued receipt of these polls indicates to the agent server 140 that the particular participant is active. Conversely, cessation of receipt of these polls from a participant causes the agent server 140 to conclude that the particular participant has become inactive.

A participant may transmit a de-registration message to the agent server 140 to indicate that it no longer wants to participate in a collaboration. Alternatively, a participant can transmit a suspension request to indicate that it wants to temporarily suspend participation in the collaboration. Receipt of a de-registration request causes the agent server 140 to remove the participant and its consume requests from the instance data so that another participant of the same type can register in the collaboration, whereas receipt of a suspension request maintains the participant's spot in the collaboration. Thereafter, the suspended participant may re-register in the same collaboration to recommence participating in the collaboration.

The method by which a participant stops participating in a collaboration is relevant to the enable notifications request as it affects the consume requests that a participant receives when it enables notifications again. When a participant de-registers and then registers again, its consume requests are evaluated exactly the same as though the participant was joining for the first time. Any satisfied consume requests at the time the enable notifications request is made generate a consume request notification, even if the participant had already received a notification for the same values satisfying the consume request before de-registration. Instead, when a participant sends a suspension request, the behavior is slightly different. The participant will only be notified if there are newly-updated data item values for which the participant has not already received a consume request notification.

When a participant wishes to share data, it generates a data share message with the data item values and transmits it to the agent server 140. The data share message includes the participant token and the URI of the share definition in the participant definition 208 corresponding to the values being shared. Upon receiving the data share message, the agent server 140 determines if the participant is permitted to share the specified data item values using the participant definition 208 stored in the collaboration model. If the agent server 140 determines that the participant is permitted to share the particular data item values with the collaboration, the agent server 140 then processes the shared values to update the data item values in the collaboration and determine if any registered consume requests undergo a state change as a result.

Sharing Data

The method of receiving and providing shared data item values by the stateful data-sharing service will now be described with reference to FIGS. 1 to 4, 6, and 12 to 14.

The agent server 140 uses the concept of transactions in processing data item value updates to properly isolate changes across participants so that the data item values passed on to participants upon a change of state of consume requests are consistent and current. For example, if a collaboration contains address information and a person, then transactions help to ensure that only address information related to the person currently active in the collaboration instance data is currently active, thus maintaining consistency in the information for the context of the user. Having several addresses for different people all active in the collaboration instance data at the same time could result in inconsistent information being delivered to participants that need relevant addresses. By grouping data item values according to transactions, consistency of data in a collaboration that is provided to participants can be ensured.

Transactions are sets of one or more logically-related operations performed on data item values. One or more participants can cooperatively perform the operations without knowledge of each other's existence or functions. When a set of data item values that was generated independent of any values received from the collaboration is shared via the agent server 140, it is referred to as the root of a transaction and is assigned a new transaction ID. As any of the root set of data item values is used by other participants to generate values for additional data items, those data item values form part of the same transaction and are assigned the same transaction ID. Participants receive the current transaction ID when they are notified with values matching their consume requests, and communicate this transaction ID when sharing data item values derived from the received values to enable the agent server 140 to identify which transaction the shared data item values relate to. In this manner, the agent server 140 tracks and segregates data item values for separate transactions, ensuring that the data item values that it receives form part of the current transaction and not part of a prior transaction.

The agent server 140 coordinates the transactions by simply receiving consume requests for data, and registering when the state of these consume requests change. The state of a consume request includes whether or not the consume request is satisfied by the data item values in the collaboration instance data and, if satisfied, the data item values that satisfied it. The share definitions and consume requests defined for the participants enable such transactions to be data-driven.

Figure 12:
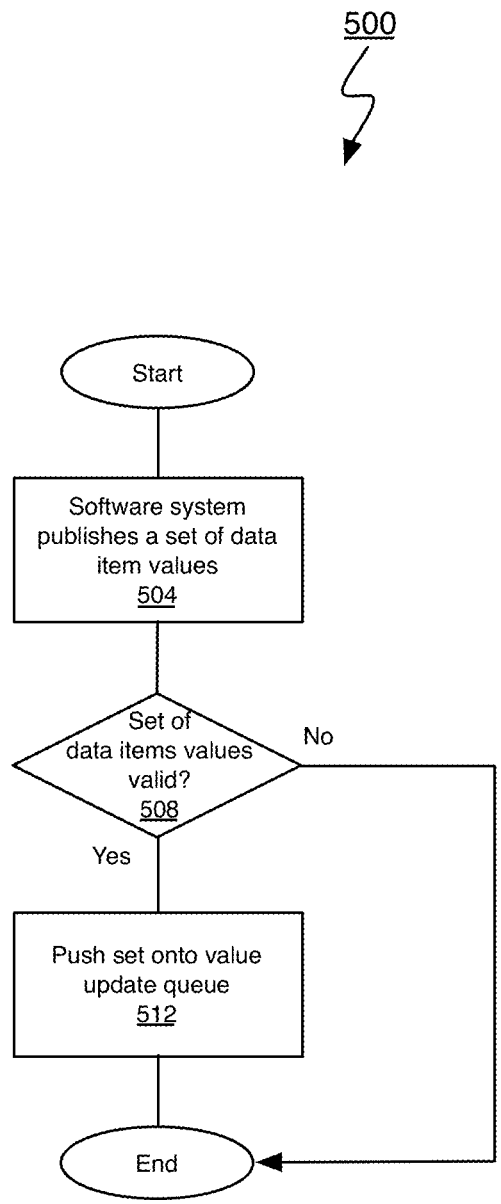
FIG. 12 is a flow chart of the general method of pre-processing sets of data item values shared by a participant used by the data-sharing server computer system of FIGS. 1 to 3.

FIG. 12 shows the method of pre-processing data item values shared by a participant (i.e., software system) generally at 500. The method 500 commences with a participant sharing a value of one or more data items (504). The participant provides the following as parameters of an HTTP request to the agent server 140:

the user token;

the participant token provided by the agent server 140 that the agent server 140 uses to look up the participant ID for the participant, and the collaboration ID of the collaboration in which the participant is participating;

a share definition URI identifying what is being shared;

value(s) for the shared data items; and a transaction ID for the set of data item value(s), if any, used to generate the data item value being published.

The agent server 140, upon receipt of the set of shared data item values, determines if the set of shared data item values is valid and should therefore be used to update the instance data in the collaboration (508). In particular, the agent server 140 determines if the share definition URI provided with the shared values is present in the corresponding participant definition stored in the collaboration model, and that the values being shared match the criteria for the data items in the share definition. If the agent server 140 determines that the share definition URI is not in the corresponding participant definition in the collaboration model or if it determines that the values being shared do not match the criteria for the data items in the share definition, the agent server 140 discards the shared set of data item values and the method 500 ends.

If, instead, the agent server 140 determines that the share definition URI is in the corresponding participant definition in the collaboration model and if it determines that the values being shared match the criteria for the data items in the share definition, the agent server 140 pushes the shared set of data item values onto a value update queue that it maintains (512). The agent server 140 also includes any transaction IDs received with the data item values. After placement of the set of data item values in the value update queue, the method 500 ends.

Updating Data in the Collaboration

The agent server 140 processes the sets of data item values in the value update queue and updates the instance data in the collaboration accordingly. In some cases, a software system may generate and share a set of data item values in response to receiving a set of data item values from the agent server 140 corresponding to one of its consume requests. The agent server 140, however, may know that the values used by the software system are obsolete due to a new transaction having been started. In this case, the agent server 140 discards the set of data item values received from the software system as it knows they relate to an old transaction. The agent server 140 assigns a unique transaction ID to each set of data item values that form part of a transaction.

Figure 13:
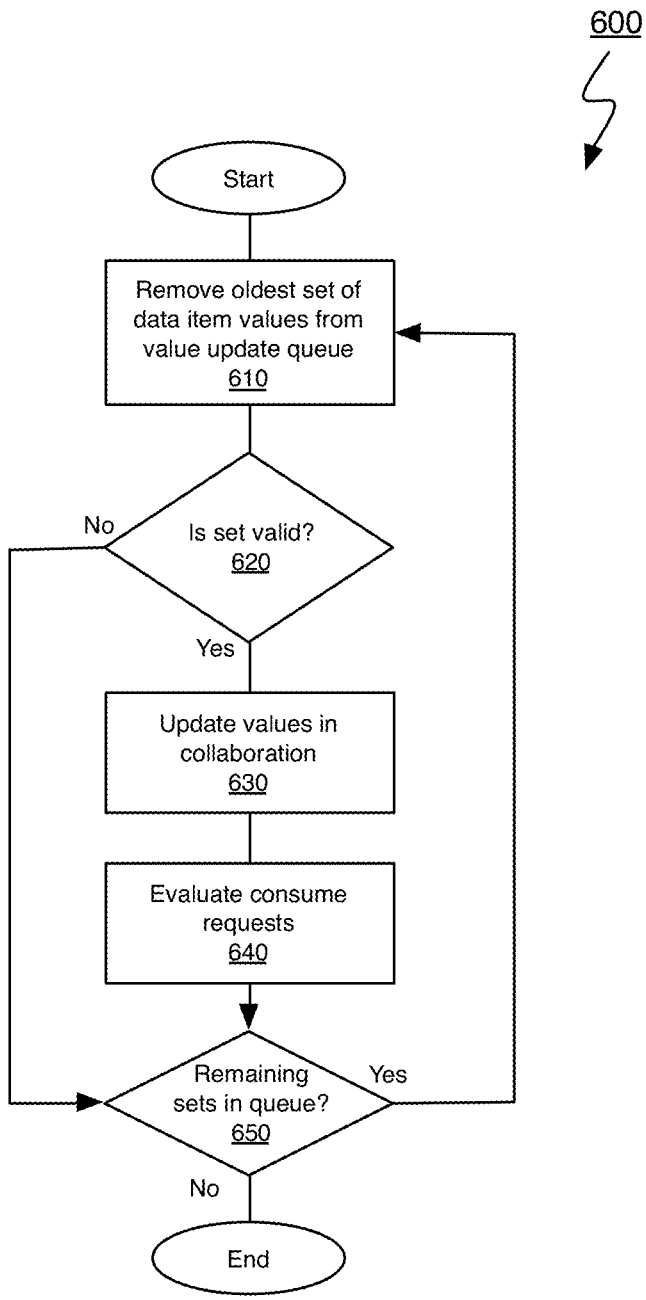
FIG. 13 is a flow chart of the general method of processing sets of data item values shared by a participant used by the data-sharing server computer system of FIGS. 1 to 3.

FIG. 13 shows the method of processing sets of data item values in the value update queue generally at 600. This method 600 is executed whenever the value update queue has at least one set of data item values for updating in it. The method 600 begins with the removal of the oldest set of data item values from the value update queue (610). The agent server 140 generally processes sets of data item values in the order that they are received. The set of data item values is accompanied by the URI of the share definition for the set of shared values and the transaction ID, if any, identifying the transaction to which the data item values belong. The agent server 140 then determines if the data item values in the set removed from the value update queue are valid (620). In particular, the agent server 140 determines if the data item values are part of a current or outdated transaction. If the set of data item values removed from the value update queue was not accompanied by a transaction ID, the set of data item values are taken to begin a new transaction. If the set of data item values removed from the value update queue were accompanied by a transaction ID, the agent server 140 examines the transaction ID to determine if it is still current. That is, the agent server 140 determines if the set of data item values put into the value update queue correspond to an outdated or current transaction. If the data item values are part of a prior transaction, the data item values are deemed to be invalid.

If the set of data item values removed from the value update queue are determined to be valid by the agent server 140 at 620, the agent server 140 updates the set of data item values in the instance data of the collaboration (630). If the set of data item values does not have a transaction ID, then the agent server 140 also generates a new unique transaction ID for the set of data item values placed in the instance data of the collaboration.

Once the agent server 140 has updated the instance data in the collaboration for the new data item values, the agent server 140 evaluates the registered consume requests (640) for all participants. If a consume request has undergone a state change, the agent server 140 flags the consume request as having undergone a state change so that the participant will be notified upon receiving the next poll. For server-side participants, the agent server 140 provides the data item values to the corresponding proxy participant. Upon evaluating all of the registered consume requests for the data item values updated, the updating of the set of data item values is complete and the agent server 140 determines if there are remaining sets of data item values in the value update queue (650). Additionally, if the set of data item values are deemed invalid at 620, the agent server 140 then determines if there are remaining sets of data item values left in the value update queue at 650. If the agent server 140 determines there are remaining sets of data item values to be updated in the value update queue at 650, the method 600 returns to 610, wherein the agent server 140 removes the oldest remaining set of data item values from the value update queue. If, instead, the agent server 140 determines that there are no remaining sets of data item values in the value update queue, the method 600 ends.

Evaluating Consume Requests

Figure 14:
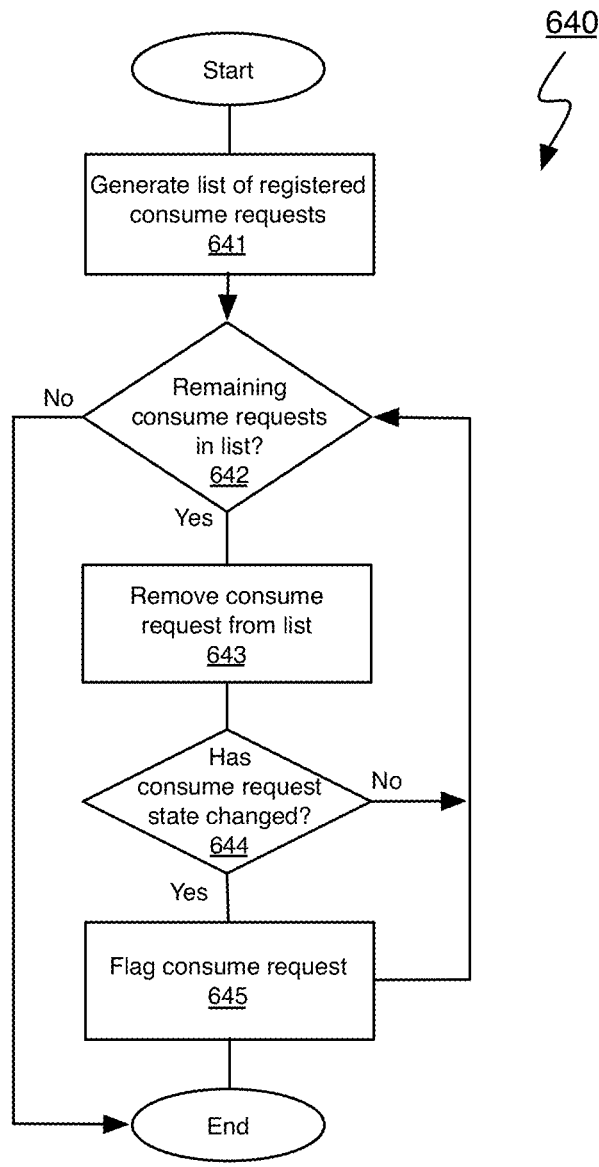
FIG. 14 is a flow chart of the general method of evaluating consume requests used by the data-sharing server computer system of FIGS. 1 to 3.

FIG. 14 shows the process of evaluating the consume requests at 640 in the method 600 in greater detail. First, the agent server 140 generates a list of all registered consume requests (641). The agent server 140 only reviews consume requests registered in the instance data in the collaboration; that is, registered consume requests for software systems that are believed to be active. The list of consume requests generated at 641 may be empty or may include one or more consume requests. The agent server 140 then determines if there are any remaining consume requests in the list (642).

If there are remaining consume requests in the list, then the agent server 140 removes a consume request from the list (643). The agent server 140 determines if the consume request removed from the list has undergone a state change (644). As previously noted, consume requests have undergone a state change if the consume request becomes satisfied or becomes unsatisfied, or, if satisfied, if the data item values that satisfied it have changed.

The consume request is satisfied if the query evaluator can semantically resolve the data requested in the included standing query to valid data item values in the instance data in the collaboration using the semantic descriptors for those data items; that is, if the standing query returns results.

As previously noted, consume requests can be defined to query the data only in the collaboration model (directory consume requests), in the instance data (consume requests), or can query the data in both the collaboration model and the instance data (multi-graph consume requests). In determining whether a multi-graph consume request has changed state, Multi-graph consume request definitions can be defined for information from both the participant definition and other data in the collaboration. Multi-graph consume requests can specify a preference for requested data from the collaboration model or the instance data. That is, a multi-graph consume request can specify a query for data in the collaboration model and the instance data, but that data in the instance data overrides the data in the collaboration model. Alternatively, a multi-graph consume request can specify that the data in the collaboration model overrides the data in the instance data.

If the consume request has not undergone a state change, the agent server 140 determines if there are remaining consume requests in the list at 642. If the consume request has undergone a state change, the agent server 140 flags the consume request (645). After the consume request is flagged at 645, the agent server 140 determines if there are remaining consume requests in the list at 642. Once the agent server 140 determines that there are no remaining consume requests in the list at 642, the process of evaluating the consume requests is complete.

It is undesirable to process consume requests for participants that are no longer registered in the collaboration. In order to ensure that the agent server 140 only processes consume requests for active or suspended participants in the collaboration, consume requests for de-registered participants are removed from the instance data in the collaboration. When a software system is configured to terminate participating in a collaboration, such as when it is shutting down, the software system transmits a de-registration request with its participant token and user token to the agent server 140. In response, the agent server 140 notes the de-registration of the software system and removes the consume requests of the software system and the registration of the software system itself from the instance data in the collaboration. Additionally, when the agent server 140 stops receiving polls from a software system, the agent server 140 can de-register the software system and its consume requests from the collaboration. The agent server 140 maintains the data item values in the instance data in the collaboration provided by a software system that de-registers, unless directed otherwise by the software system.

During the lifetime of a collaboration, the agent server 140 repeatedly determines if a collaboration destruction condition has been satisfied. If a particular collaboration destruction condition specified in the collaboration definition corresponding to a collaboration is satisfied, the agent server 140 destroys the collaboration.

Representative Types of Participants in Collaborations

Figure 15A:
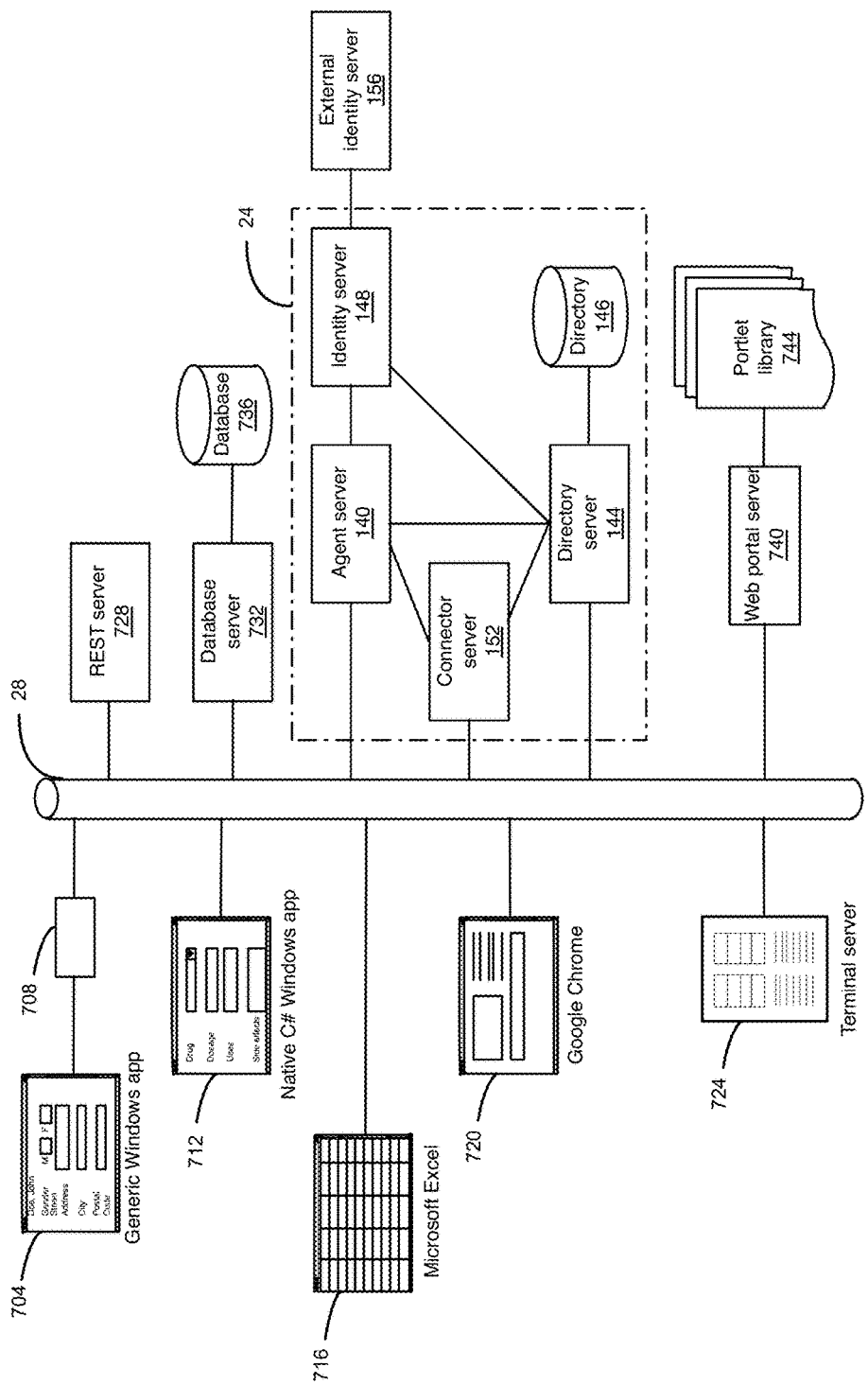
FIG. 15A shows a schematic diagram of various logical components of software systems that can participate in a collaboration managed by the data-sharing server computer system of FIGS. 1 to 3.

FIG. 15A illustrates various representative types of software modules, programs, applications, services, etc. that can make up software systems that can participate in a collaboration. A generic MICROSOFT WINDOWS application 704 executing on a personal computing device is shown in communication with the communications network 28 via a MICROSOFT WINDOWS application adapter 708. A native C# MICROSOFT WINDOWS application 712, MICROSOFT Excel 716, and a GOOGLE CHROME web browser 720 also executing on the same or other personal computing devices are also shown in communication with the communications network 28. Further, a terminal server computer 724, a REST server computer 728, a database server computer 732 are in communication over the communications network 28. The database server computer 732 provides access to data stored in a database 736. A web portal server 740 is also in communication with the other components via the communications network 28. Further, the agent server 140, the directory server 144 and the connector server 152 are also in communication with some or all of the other above-noted components via the communications network 28.

Figure 15B:
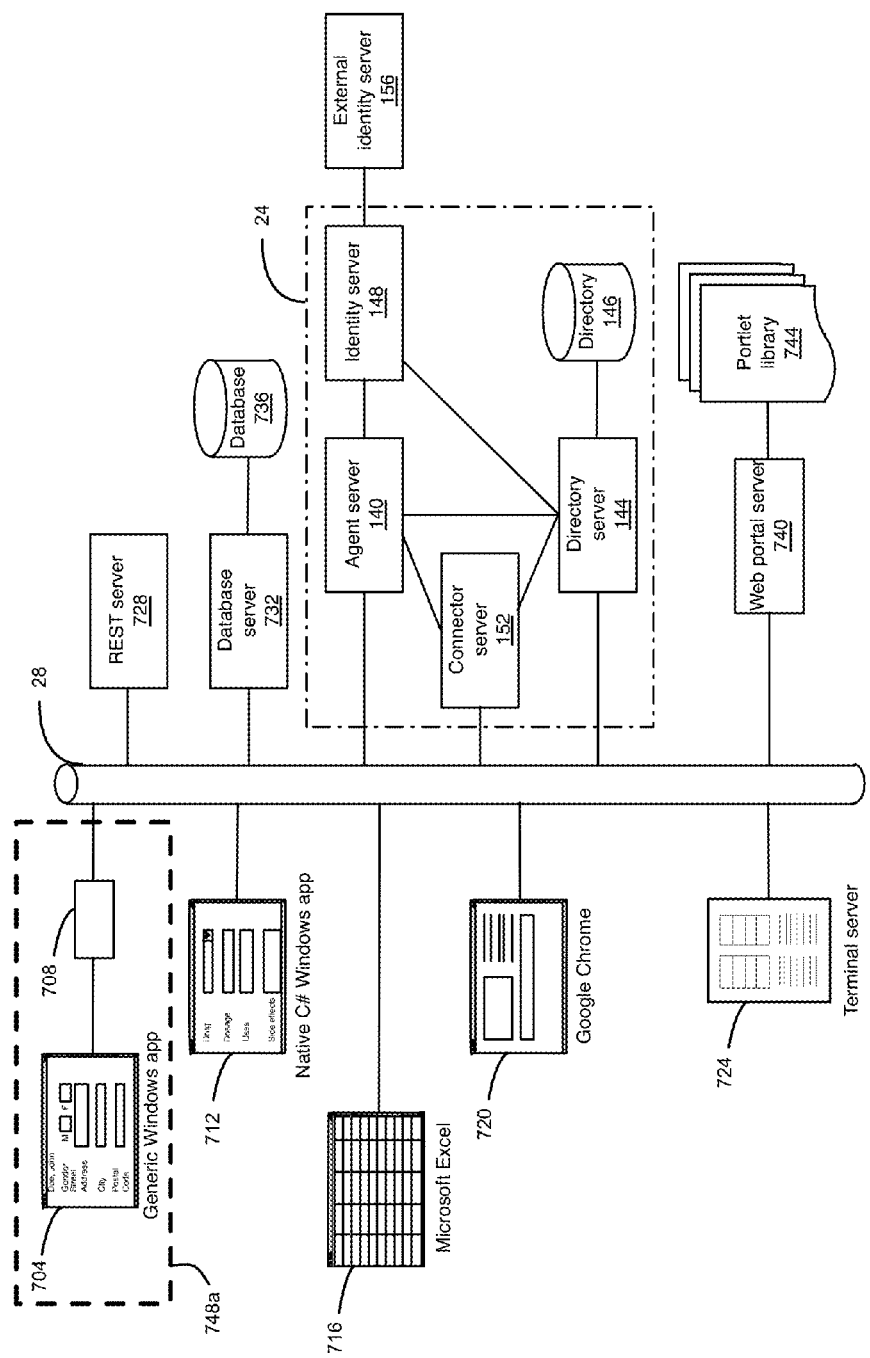
FIGS. 15B to 15H show the delineation of each separate software system that can participate in a collaboration managed by the data-sharing server computer system of FIGS. 1 to 3.

FIG. 15B identifies the generic MICROSOFT WINDOWS application 704 and the MICROSOFT WINDOWS application adapter 708 as forming a first software system 748a. The MICROSOFT WINDOWS application adapter 708 communicates with the generic MICROSOFT WINDOWS application 704 via MICROSOFT User Interface Automation functionality. When this functionality is enabled on a MICROSOFT WINDOWS-based computer, the MICROSOFT WINDOWS application adapter 708 can observe the generic MICROSOFT WINDOWS application 704 and share data item values that are updated therein. The MICROSOFT WINDOWS application adapter 708 polls the agent server 140 for consume request notifications and retrieves updated values for data items corresponding with consume requests and uses those values to populate the fields of the generic MICROSOFT WINDOWS application 704.

Figure 15C:
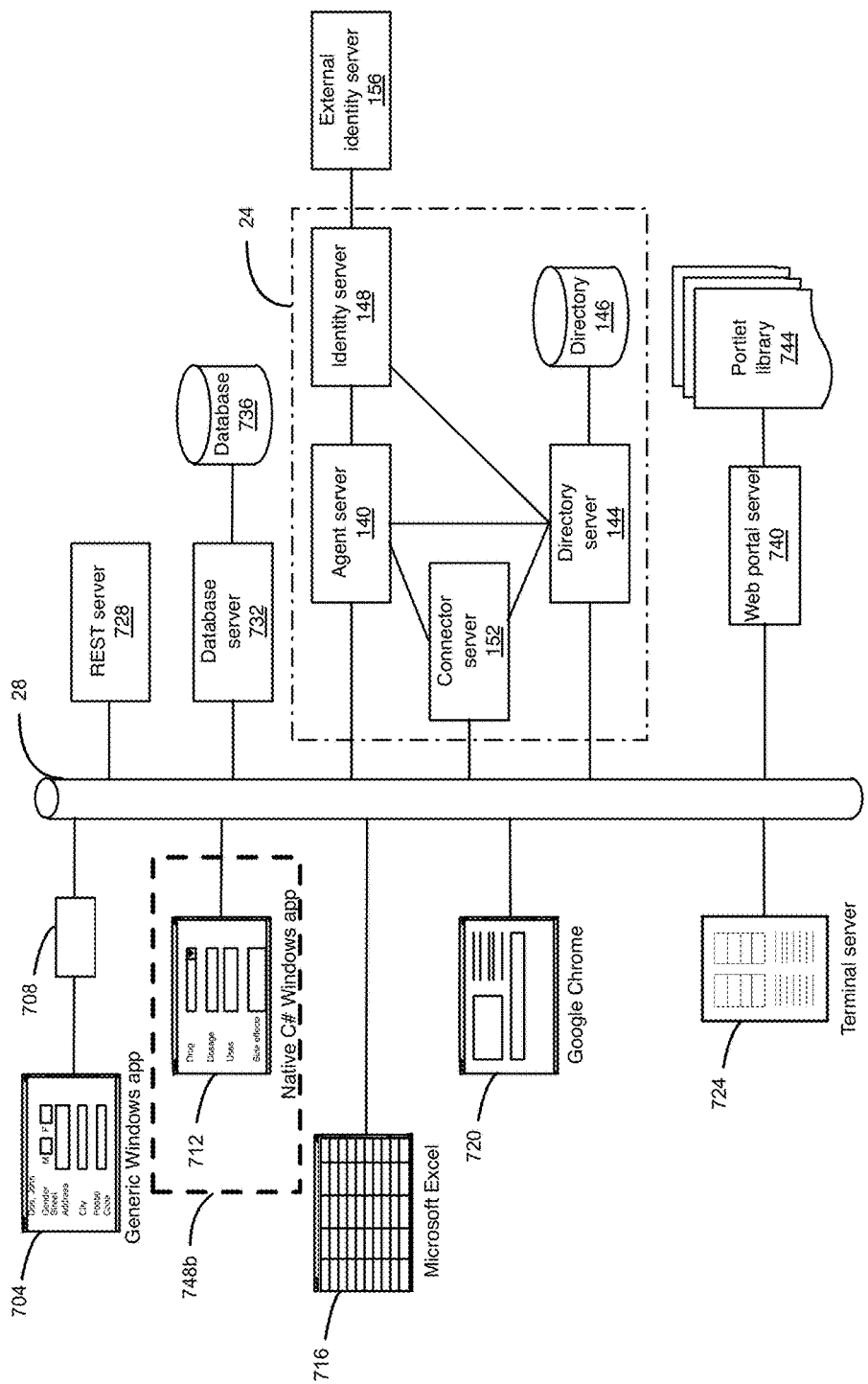

FIG. 15C shows a second software system 748b, wherein the native C# MICROSOFT WINDOWS application is programmed to interact with the agent server 140 to participate in collaborations.

Figure 15D:
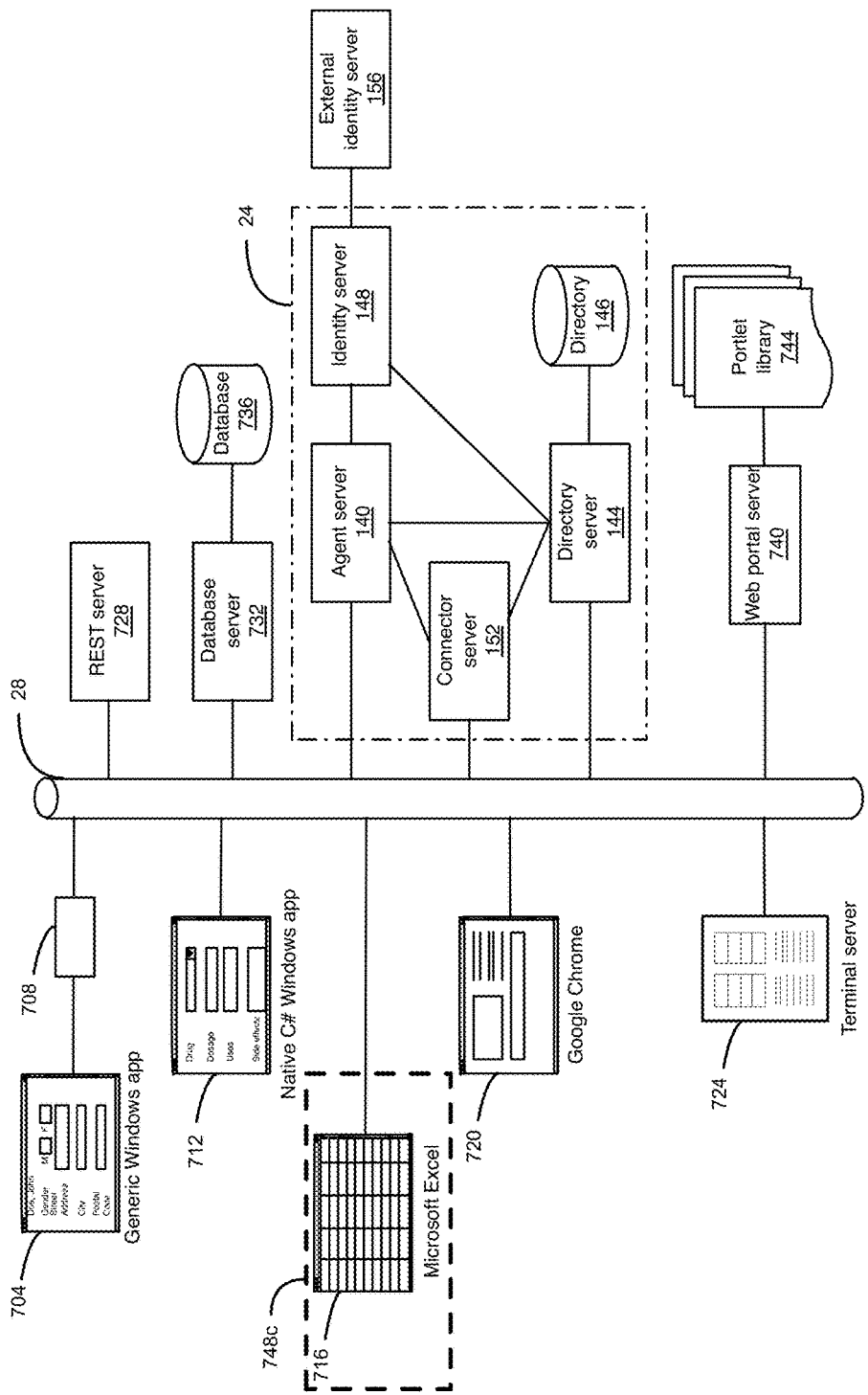

FIG. 15D shows a third software system 748c that includes MICROSOFT EXCEL 716. An add-in is installed in MICROSOFT EXCEL. The add-in extends the functionality of Excel by defining a set of custom functions that permit share definitions and consume requests to be defined in cells of a spreadsheet. In addition, the custom functions enable a user to provide login credentials entered in the spreadsheet to the stateful data sharing service when the spreadsheet is opened. The share definition function provided with the add-in causes updated values of the function to be communicated to the agent server 140. The consume request function provided with the add-in periodically queries the agent server 140 for consume request notifications.

Figure 15E:
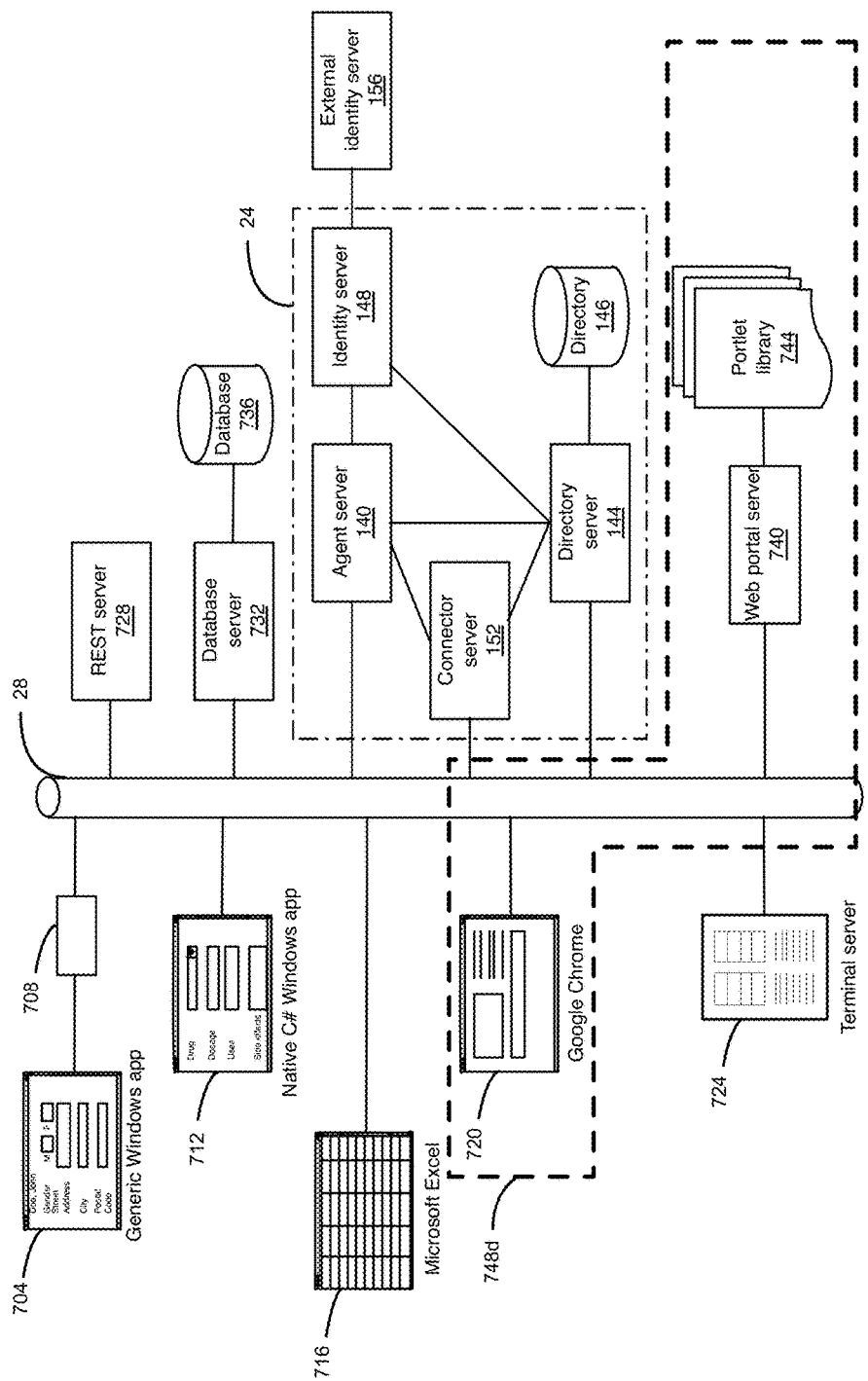

FIG. 15E shows a fourth software system 748d, wherein the GOOGLE CHROME web browser 720 communicates with the web portal server 740 to retrieve web pages. This is implemented in one of two ways. Native JavaScript is injected into web pages received from the web portal server 740, by a browser extension, dynamic proxy, or server side filter, enabling them to interact with the agent server 140 to participate in collaborations and share data within web pages.

Figure 15F:
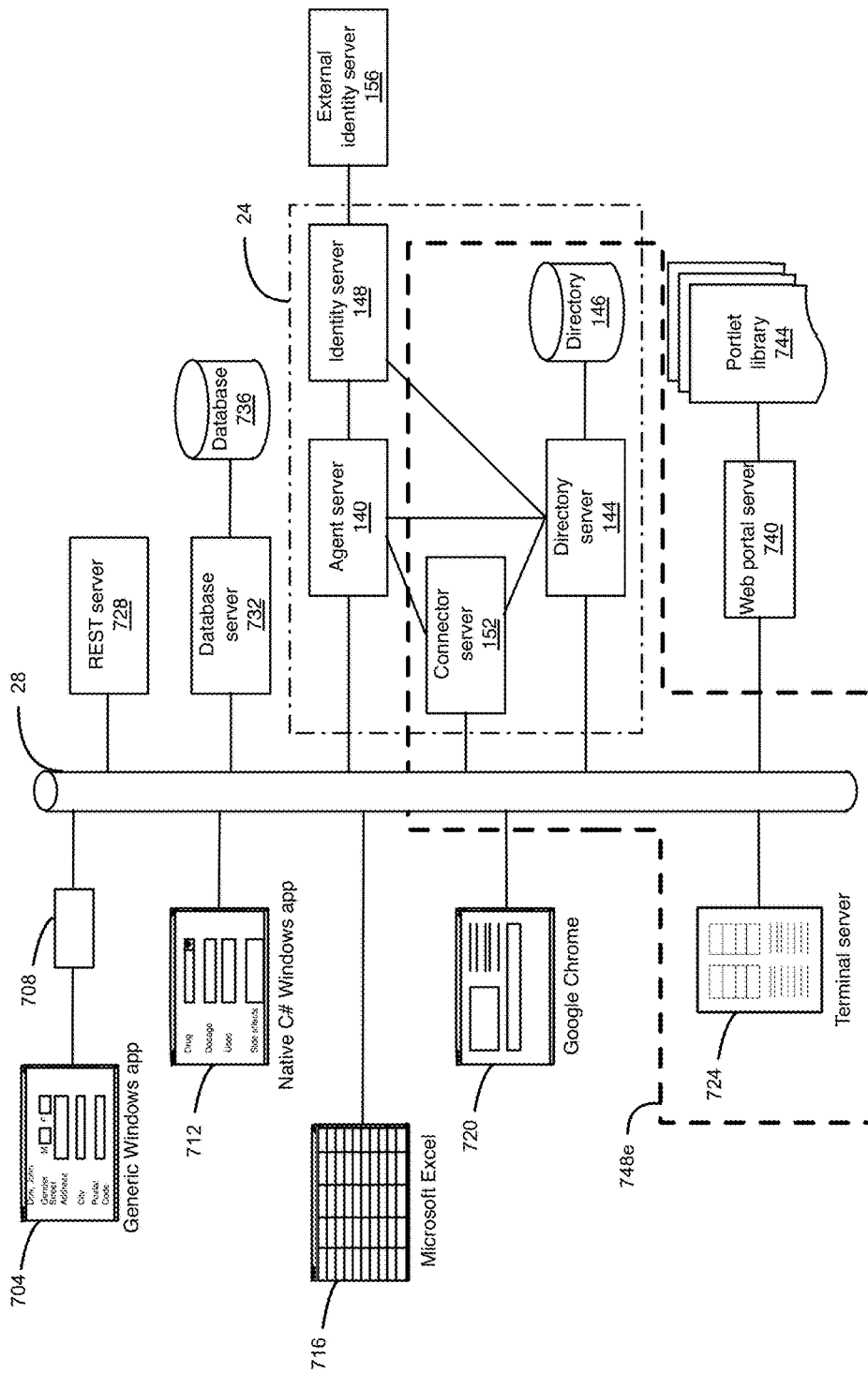

FIG. 15F shows a fifth software system 748e, wherein a terminal services connector executed by the connector server 152 connects to the terminal server computer 724. The consume requests within the participant definition 208 include the URL of the terminal server computer 724 and terminal commands to be executed when data item values in the collaboration cause the consume request state to change. A consume request can have an associated share definition in the participant definition corresponding to data item values generated by the terminal server computer 724 in response to the terminal commands that are to be shared with the collaboration. When a collaboration is created that includes a proxy participant associated with the terminal services connector, the agent server 140 instantiates and registers the proxy participant. As the proxy participant is provided data item values for a consume request that underwent a state change, it passes the values to the terminal services connector, together with the user token, the participant definition URI, and the consume request definition URI. In response, the terminal services connector retrieves the consume request definition and any associated share definitions from the directory server 144. The consume request definition includes the URL of the terminal server computer 724 and any syntax for generating associated terminal commands. The terminal services connector then generates terminal commands including these data item values and transmits them to the terminal server computer 724, and provide data item values returned by the terminal server computer 724 to the proxy participant in response to the terminal commands. The proxy participant, in turn, shares these values with the collaboration via the agent server 140.

Figure 15G:
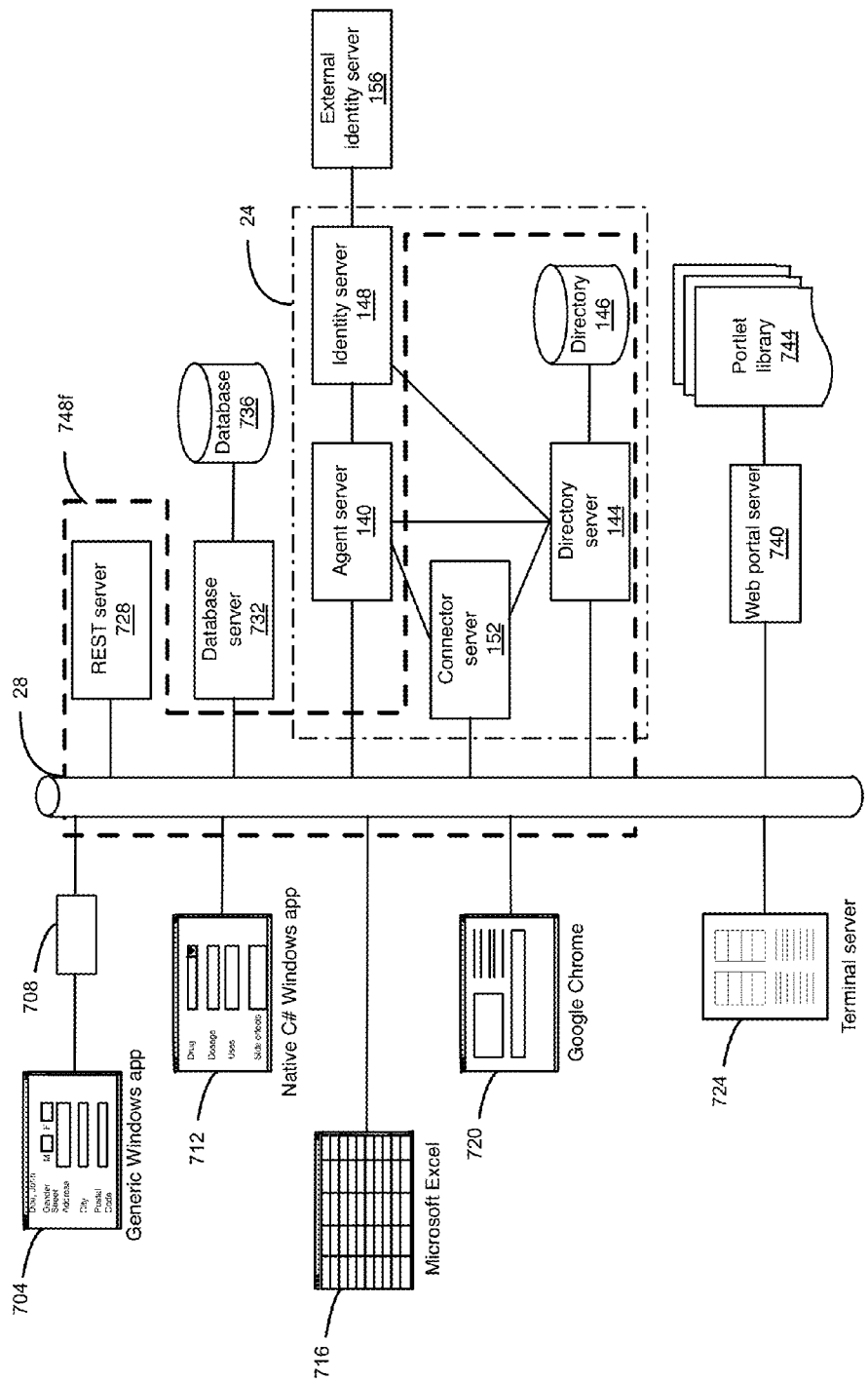

FIG. 15G shows a sixth software system 748*f*, wherein a REST connector executed by the connector server 152 connects to the REST server computer 728. The consume requests within the participant definition 208 include the URL of the REST server computer 728, as well as mapping statements that allow information from the collaboration to be used to generate, and determine the type (GET/POST) of the resource request. When a collaboration is created that includes a proxy participant associated with the REST connector, the agent server 140 instantiates and registers the proxy participant. As the proxy participant is provided data item values for a consume request that underwent a state change, it passes the values to the REST connector, together with the user token, the participant definition URI, and the consume request definition URI. In response, the REST connector retrieves the consume request definition and any associated share definitions from the directory server 144. The consume request definition includes the URL of the REST server computer 728 and any syntax for generating associated commands. The REST connector can then generate and send REST requests including the data item values to the REST server computer 728, and provide data item values returned by the REST server computer 728 to the proxy participant in response to the REST requests. The proxy participant, in turn, shares these values with the collaboration via the agent server 140.

Figure 15H:
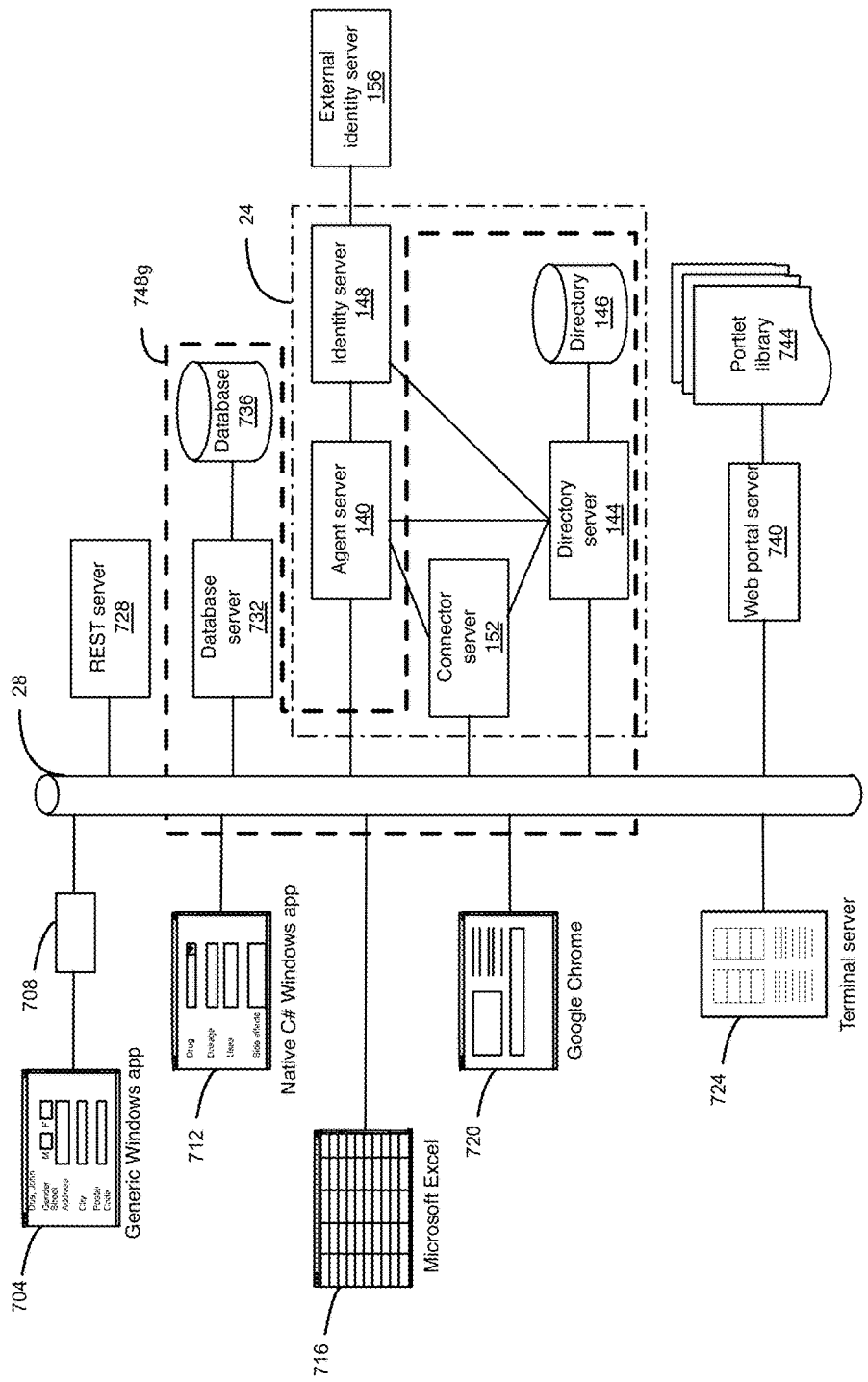

FIG. 15H shows a seventh software system 748*g*, wherein a database connector executed by the connector server 152 connects to the database server computer 732. The consume requests within the participant definition 208 include the URL of the database server computer 732 and parameters for constructing database queries and write messages. When a collaboration is created that includes a proxy participant associated with the database connector, the agent server 140 instantiates and registers the proxy participant. As the proxy participant is provided data item values for a consume request that underwent a state change, it passes the values to the terminal services connector, together with the user token, the participant definition URI, and the consume request definition URI. In response, the database connector retrieves the consume request definition and any associated share definitions from the directory server 144. The consume request definition includes the URL of the database server computer 732 and any syntax for generating associated database requests. The database connector then generates database queries and write messages using the information from the consume request definition and transmits them to the database server computer 732. The database connector can then provide data item values returned by the database server computer 732 to the proxy participant in response to the database queries. The proxy participant, in turn, shares these values with the collaboration via the agent server 140.

Figure 15I:
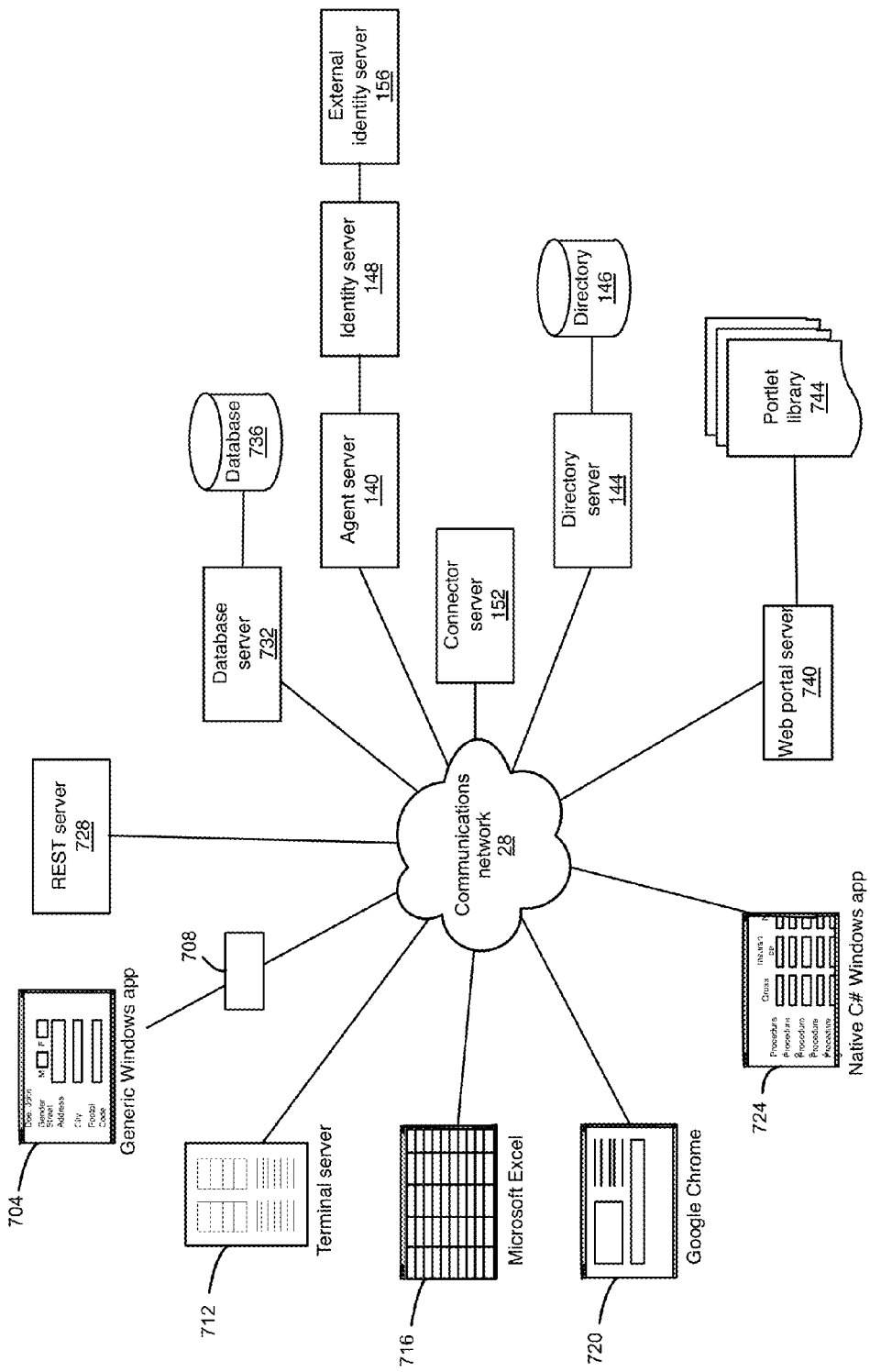
FIG. 15I shows an alternative configuration of the logical components of the software systems and the data-sharing server computer system of FIG. 15A.

FIG. 15I shows an alternative configuration for the components shown in FIGS. 15A to 15H. In this alternative configuration, each of the components is in communication with the other components over the communications network 28. The directory server 144, connector server 152 and agent server 140 can all be located remotely from one another. Even though the identity server 148 and the external identity server computer 156 are shown in direct communication with the agent server 140, it should be understood that these services can also be located remotely from the other components. This is made possible as the addresses of each server are provided as a URL.

In another configuration, it may be desirable to locate a connector server 152 topologically adjacent the resource(s) and/or server(s) providing functionality that they are accessing for performance and/or security reasons.

Illustrative Example of Operation of System

In order to illustrate the functioning of the system, its operation will now be described with reference to the configuration of FIG. 3, and with reference to FIGS. 4 to 8, and 12 to 14.

As previously discussed, the first software system includes the CRM client 160 executing on the desktop computer 20. The CRM client 160 communicates with a CRM database (not shown) that centrally manages contacts. The CRM client 160 has been customized to communicate with the agent server 140 in order to participate in collaborations.

The second software system includes the project management application 164 for managing projects for customers. The project management application 164 communicates with a server (not shown) that centrally stores project management data. The project management application 164 has been customized to communicate with the agent server 140 in order to launch collaborations and to participate in them.

The third software system includes the support view web page 168 for tracking support issues for customers. The support view web page 168 is generated by and communicates with a web server (not shown) that centrally manages support data for customers. The support view web page 168 has been customized to communicate with the agent server 140 in order to launch collaborations and to participate in them.

The fourth software system includes a sales database client 172 for accessing sales data for customers. The sales database client 172 communicates with a sales database (not shown) that centrally manages the sales data for customers. The sales database client 172 has been customized to communicate with the agent server 140 in order to launch collaborations and to participate in them.

The fifth software system includes an accounting system client 176 for accessing accounting data for customers. The accounting system client 176 communicates with an accounting system (not shown) that centrally manages accounting data for customers. The accounting system client 176 has been customized to communicate with the agent server 140 in order to launch collaborations and to participate in them.

A user would typically have the CRM client 160 open during the course of the day to select a customer to work on. Upon executing the CRM client 160 on the desktop computer 20 at the start of the day, programming code in the CRM client 160 obtains user login credentials from the user and communicates them to the agent server 140. In response, the agent server 140 provides these credentials to the identity server 148 for authentication. Once authenticated, the identity server 148 generates a user token associated with the user's identity, and returns it to the agent server 140, which forwards it to the CRM client 160. Upon receipt of the user token, the CRM client 160 generates and transmits a participant registration request to the agent server 140 at 304. The participant registration request includes the URI of the participant definition 208 corresponding to the CRM client 160 and the user token. The agent server 140 passes the user token to the identity server 148 at 316 for validation and role determination. In turn, the identity server 148 validates the user token, looks up the role for the user associated with the user token and provides the role to the agent server 140 along with a response indicating that the user token is validated.

The agent server 140 then determines if a user space associated with the user's identity exists at 320. If one doesn't yet exist, the agent server 140 creates it at 324.

Figure 16:
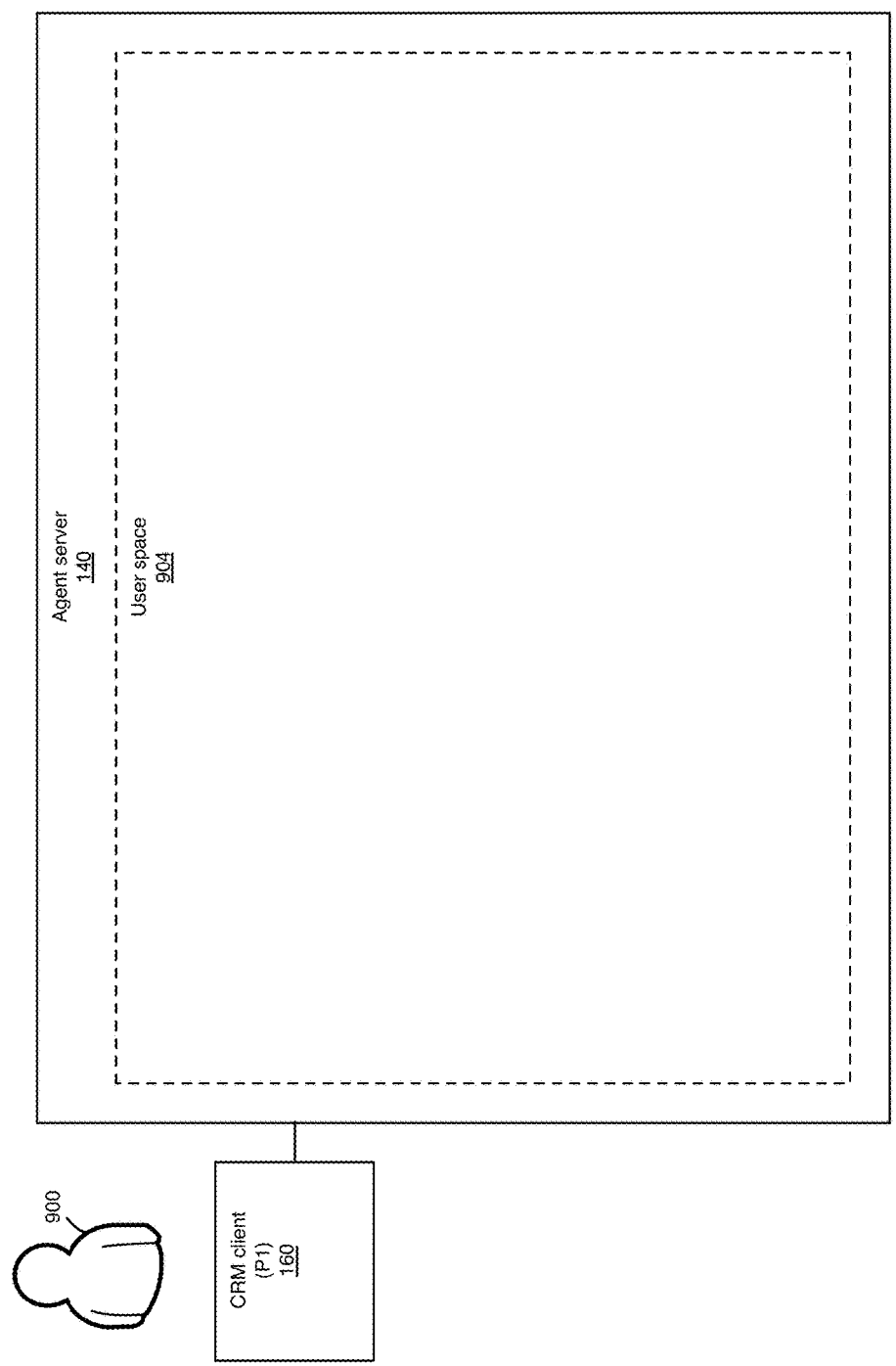
FIG. 16 illustrates the system of FIG. 3 after the data-sharing server computer system creates a user space for a user.

FIG. 16 shows a scenario where a user 900 activates the CRM client 160 on the desktop computer 20. The user 900 has a role of "Professional Services". As shown, the agent server 140 has created a user space 904 for the user 900 at 324.

The agent server 140 then retrieves the collaboration definition priority table 224 associated with the CRM client 160 at 328. This collaboration definition priority table is shown at 224a in FIG. 5A. Upon retrieval of the collaboration definition priority table 224a, the agent server 140 determines the collaboration type to register the participant in at 332. For a user with the role "Professional Services", the collaboration definition priority table 224a indicates that the "Customer Project History" collaboration type has the highest priority value ("3"), followed by the "Customer Contact History" collaboration type ("2"), then by the "Customer Account Overview" collaboration type ("1"). Accordingly, the agent server 140 determines that the CRM client 160 should be registered in a collaboration of the type "Customer Project History".

The agent server 140 determines that a collaboration of the determined type and having space does not exist at 336, so the agent server 140 creates the collaboration at 340.

Figure 17:
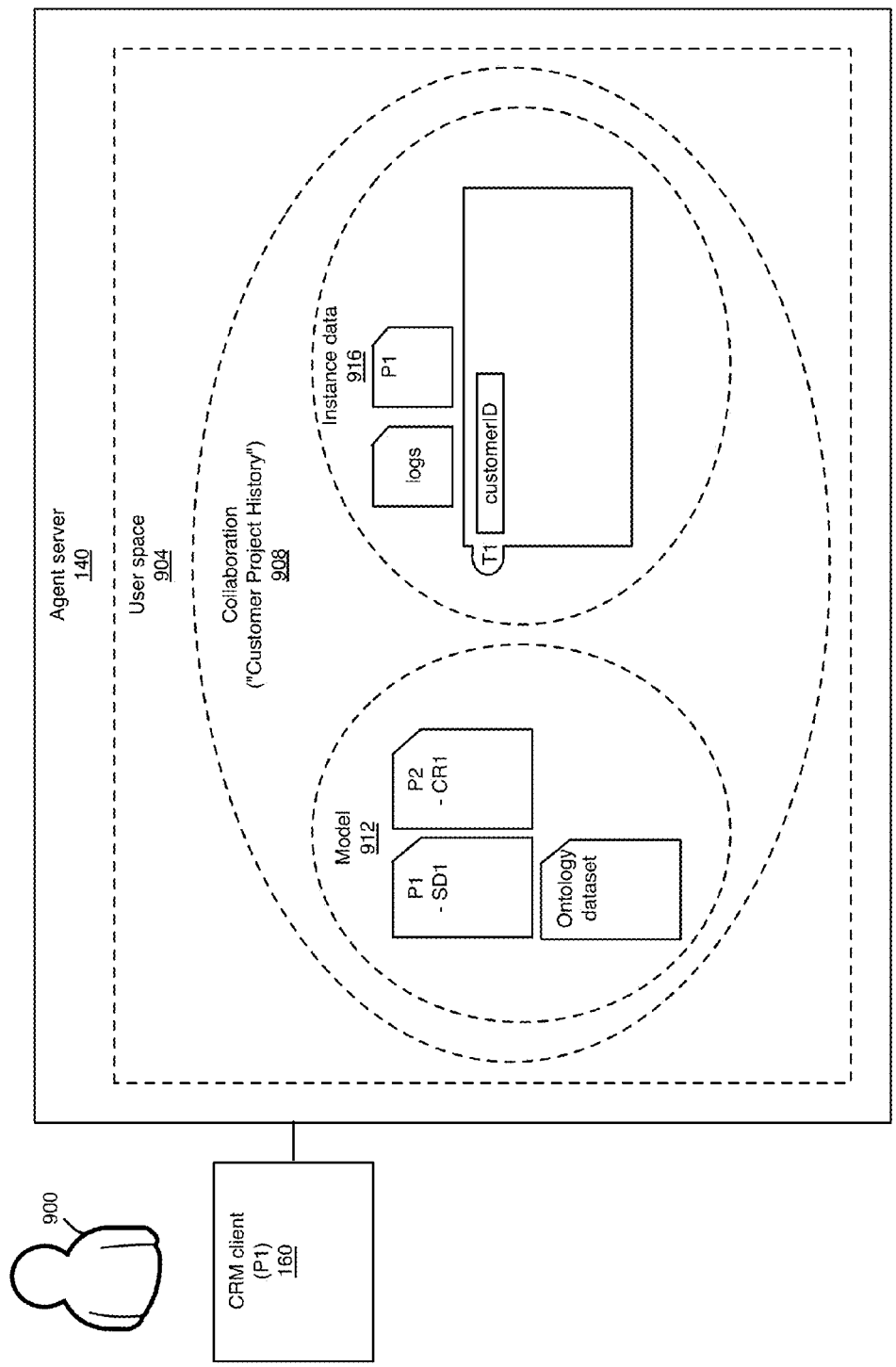
FIG. 17 illustrates the state of a collaboration created in the user space for the CRM client that is registered therein.

FIG. 17 shows the agent server 140 having created a collaboration 908 of the type "Customer Project History". The collaboration 908 has a collaboration model 912 and instance data 916. The collaboration model 912 is populated with the participant definitions 208 and the ontology dataset 212 listed in the collaboration definition 204 for the "Customer Project History" collaboration type. In particular, the model 912 includes the participant definition 208 for the CRM client (P1) and for a project management application type (P2). The participant definition 208 for the CRM client 160 includes a share definition (SD) as represented in pseudocode for ease of understanding:

---
- SD1: <http://company.com/P1/SD1/share>
  definition of allowed share for (customerID)
---

The participant definition for the project management application type (P2) includes the following consume request definition (CR):

---
- CR1: <http://company.com/P2/CR1>
  query for (customerID)
---

The consume request CR1 has a URI, <http://company.com/P2/CR1>. The remainder of the consume request represents a SPARQL query to execute against the instance data in the collaboration for the value for "customerID". The following is an example of the SPARQL code that may be used to define the consume request:

---
SELECT ?customerID
WHERE
{
    ?s <http://example.com/customer/active> ?customerID .
}
---

The instance data 916 includes logs, the registration of the CRM client 160 and a shared data item, "customerID". Upon registration of the CRM client 160 in the collaboration, the method 300 is complete.

When a customer is selected in the CRM client 160 by the user 900, the CRM client 160 is programmed to share the data item "customerID" with the agent server 140. As this data item is unrelated to any other data items, it forms part of a new transaction T1.

When the user 900 starts up the project management application 164, it requests user credentials. Upon entry of the user credentials, the project management application 164 transmits the user credentials to the agent server 140, which provides these credentials to the identity server 148 for authentication. Once authenticated, the identity server 148 generates a user token associated with the user's identity, and returns it to the agent server 140, which forwards it to the project management application 164. Upon receipt of the user token, the project management application 164 generates and transmits a participant registration request to the agent server 140 at 304, thus recommencing the method 300 for the new participant. The participant registration request includes the URI of the participant definition 208 corresponding to the project management application 164 and the user token. The agent server 140 passes the user token to the identity server 148 at 316 for validation and role determination. In turn, the identity server 148 validates the user token, looks up the role for the user associated with the user token and provides the role to the agent server 140 along with a response indicating that the user token is validated.

The agent server 140 then determines if a user space associated with the user's identity exists at 320. As the agent server 140 has previously created the user space 904, it determines that one exists.

The agent server 140 then retrieves the collaboration definition priority table 224 associated with the project management application 164 at 328. This collaboration definition priority table is shown at 224b in FIG. 5B. Upon retrieval of the collaboration definition priority table 224b, the agent server 140 determines the collaboration type to register the participant in at 332. For a user with the role "Professional Services", the collaboration definition priority table 224b indicates that the "Customer Project History" collaboration type has the highest priority value ("3") and, in fact, is the only collaboration type in which the project management application 164 can be registered.

The agent server 140 determines that a collaboration of the determined type and having space exists at 336. This is true as there isn't a participant of the same type as the project management application 164 registered in the instance data 916 of the collaboration 908. The agent server 140 then determines that there is only one collaboration of the determined type at 364, and thus registers the project management application 164 in the collaboration 908 at 360, after which the method 300 ends.

Figure 18:
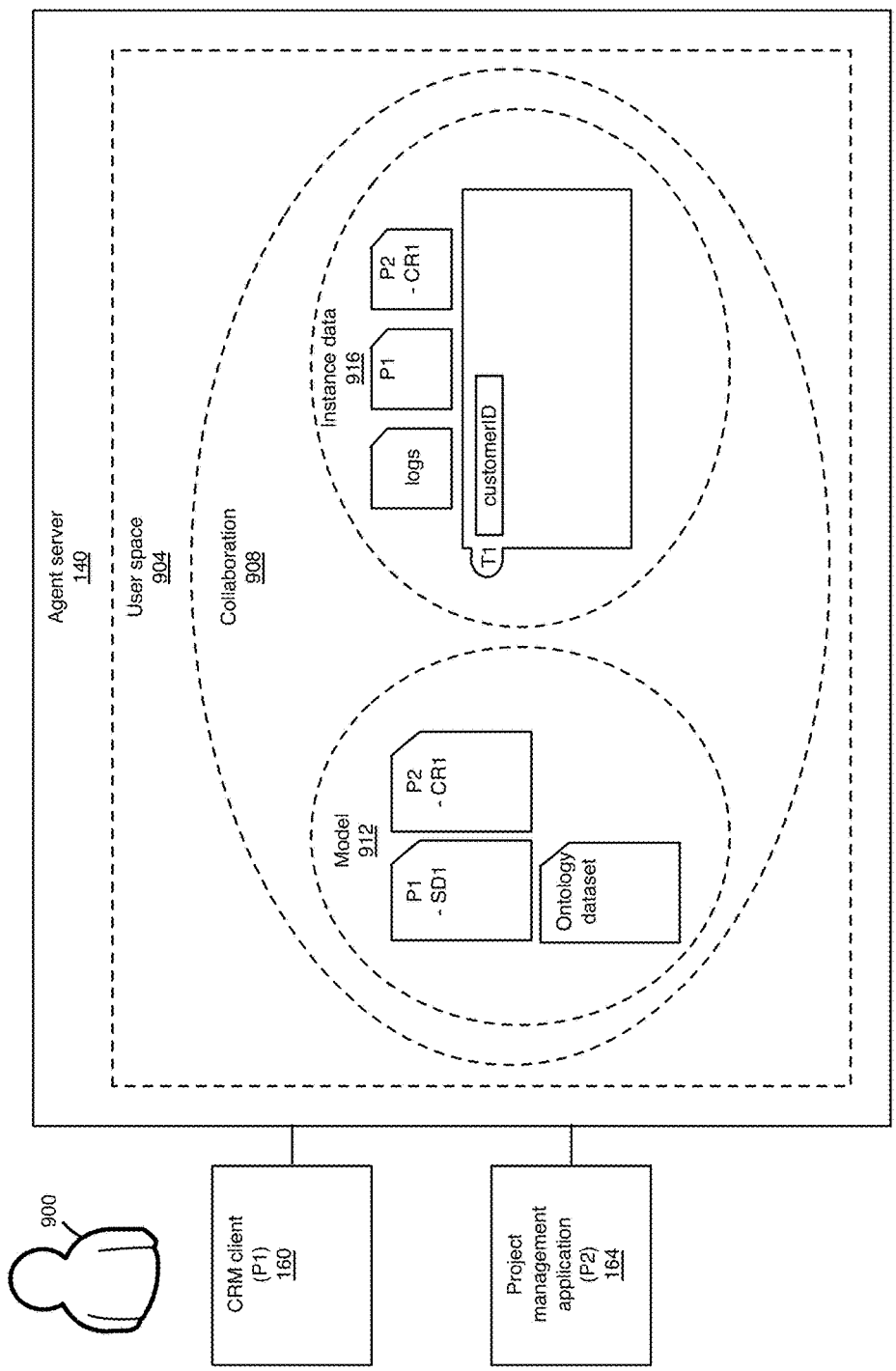
FIG. 18 illustrates the state of the collaboration of FIG. 17 after the registration of the project management application therein.

FIG. 18 shows the state of the collaboration 908 after registration of the project management application 164 therein. As shown, the instance data 916 of the collaboration 908 indicates that the project management application 164 (P2) and its consume request CR1 is registered.

Upon registration of the project management application 164 and its consume request CR1, the agent server 140 determines that the consume request CR1 has changed state. As a result, the agent server 140 flags the consume request accordingly. The next time the project management application 164 polls the agent server 140 to determine if there's a change in the state of its consume requests, the agent server 140 responds with an indication that consume request CR1 has changed state. The project management application 164 then retrieves the value that satisfied the consume request CR1; that is, the value of "customerID".

After retrieving the value of "customerID", the project management application 164 uses the value to retrieve and present all projects associated with the customer associated with the value of "customerID".

When the user 900 desires to review the projects of a different customer, he interacts with the CRM client 160 to select the customer. Upon selecting the new customer, the CRM client 160 shares the new value for "customerID" associated with the new customer with the agent server 140. Upon receiving the new value for "customerID" from the CRM client 160, the agent server 140 determines that the value is not associated with the current transaction. As a result, the agent server 140 subsequently commences a new transaction and places the new value for "customerID" in the new transaction.

The data-sharing server computer system 24 thus determines a priority for a subset of the collaboration definitions for participant registration requests in response to their receipt, and registers participants in collaborations corresponding to one of the collaboration definitions selected at least partially based on the priorities. In this manner, the data-sharing server computer system 24 can intelligently group software systems together to collaborate based on determined priorities for the type of collaboration that each software system should participate in.

While the method of registering software systems in data sharing sessions in accordance with the invention has been described with respect to a particular embodiment, those skilled in the art will appreciate that various modifications can be made without affecting the underlying inventive approach.

While the main embodiment describes the various components of the stateful data-sharing service residing on the same physical computer, those skilled in the art will appreciate that the components can reside on separate physical computers. Further, the software systems can also reside on the same physical computer or on separate computers.

The participant definitions, the collaboration definitions and other artefacts can be stored in various manners, such as files, database entries, etc.

While, in the described embodiments, the participant definitions, ontology datasets, etc. are instantiated in a collaboration model, they can also be retrieved from non-volatile storage as needed.

The priority values can be determined explicitly or can be determined implicitly by determining a priority order for the collaboration definitions.

The priority values can be determined in a variety of manners. The static priority values can vary based on a variety of factors, such as the user role, the specific user, the user's organization, the time of day or day, etc. Static priority values (such as those stored in the collaboration definition priority tables of the described embodiment above) can be adjusted for various factors, including:

- the types of active collaborations in which other software systems of the same type are participating for other users;
- the types of active collaborations in which other software systems of the same type are participating for the same user; and
- the types of active collaborations managed for the same user in which the newly-registering software system can be registered, the registration therein of key participant types (such as other client-side participant types that suggest that registration in that collaboration type would be more beneficial), key indicator data in the collaboration shared by other software systems (that suggests that the collaboration may be more beneficial than other collaborations), etc.

Adjustment of priority values of one or more collaboration definitions can also be effected by adjusting the priority values of other collaboration definitions, as both approaches have the same effect of increasing the priority of some collaboration definitions in relation to others.

The priority values can be determined purely by a formula based on one or more factors.

Cost factors can be used in the determination of the priority values to reflect the value of resources such as databases, web services, network traffic, and processing time.

Where a collaboration is created as a result of a participant registration request, the data-sharing server computer system can cause other software systems to initialize, including on the personal computing device of the user. This can be achieved, for example, by having the agent server send an instruction to an application such as the MICROSOFT WINDOWS application adapter 708 shown in FIG. 15B to launch another software system (i.e., application, web page, etc.) on the personal computing device of the user. The software system could be provided with the collaboration ID by the agent server via the application. In this manner, commencement of performance of the task may be facilitated for the user by bringing software systems to be interacted with to complete the task to the forefront.

A list of a subset of the collaboration definitions in which the newly-registering software system can participate can be presented to the user to enable user selection therefrom. Upon selection, the data-sharing server computer system can register the software system in a collaboration of the selected collaboration type. Further, the data-sharing server computer system can record the user selections and use them to adjust the priority values for collaboration definitions in the future.

Where a participant registering with the agent server can be registered in two or more collaborations of a selected collaboration type, the agent server could elect to examine the next-highest priority collaboration definition instead of reporting an error to the participant.

The data-sharing server computer system can be configured to enable more than one software system of the same type to participate in a collaboration. In such cases, a set of rules can define what data is accepted from each software system. For example, where two or more software systems are allowed to join a collaboration, the first may be an active participant, whereas the others may be allowed to receive shared values from the collaboration, but not share values to the collaboration. In another alternative mode, both participants may be permitted to share data to the collaboration, but the data shared by one of the participants may be given priority over the data shared by the other participants. The number of active participants of the same type in a collaboration can influence the priority that the associated collaboration definition can have when determining what type of collaboration to register a participant in. In such cases, the priority values and/or method of registering software systems in collaborations can take into consideration the priority of adding an additional participant of the same type to a collaboration relative to registering the participant in another type of collaboration.

In other modes, where there is more than one collaboration that a participant may be registered into, the data-sharing server computer system can be configured to register the participant into a particular collaboration based on heuristics. For example, the data-sharing server computer system can be configured to register the participant in:

the most recently created collaboration;
the earliest created collaboration;
the collaboration with the most recent data-sharing activity (i.e., the receipt of values shared by a participant);
a collaboration of the most popular type (i.e., corresponding to the collaboration definition that is most used, either overall or using a weighted average, by a user, group of users, etc. in which the participant can participate);
a collaboration established using the collaboration definition with a relatively-low historical error or task completion rate; and/or
a collaboration of the type having a relatively low "cost" (of a resource) for completing a particular task in comparison to another collaboration type for completing the same task (e.g., the two collaboration types may retrieve the same information from different resources).

While the invention has been described with specificity to a JAVA programming language implementation, other types of implementations will occur to those of skill in the art. For example, the stateful data sharing service could be written in any one of a number of programming languages, such as Microsoft's C# or Javascript. Any general purpose programming language could be substituted.

The interfaces of the various components of the stateful data-sharing service could be substituted with any of a variety of interfaces, such as JAVA Remote Method Invocation, MICROSOFT .NET WINDOWS Communication Framework, Message queue style communications or even simple function calls.

RDF can be replaced as the metadata format by other types of metadata languages such as, for example, DAML, and XML.

SPARQL is only one possible query language for use in constructing standing queries. Other examples include XsRQL and RQL.

The stateful data-sharing service can maintain and update separate transactions in the shared value space or can create separate shared value spaces for each type of transaction.

Any identifier that provides uniqueness within the referenceable address space would work in place of URIs. For example, an integer or a Globally Unique Identifier ("GUID") could be employed.

Various components of the stateful data-sharing service can be used with multiple other instances of a component. For example, a single directory server can be used for two or more agent servers.

Other methods for associating software systems with a user can be used. For example, a user can log into the data-sharing server computer system and the IP address of the personal computing device from which the login request is received can be associated with the user for future communications. In another example, each software system can be required to provide login credentials for the user to the data-sharing server computer system. The participant token thereafter generated by the data-sharing server computer system and used by the software system for future communications can be associated with the user's identity. Still yet other methods will occur to those skilled in the art.

Computer-executable instructions for implementing the stateful data sharing service on a computer system could be provided separately from the computer system, for example, on a computer-readable medium (such as, for example, an optical disk, a hard disk, a USB drive or a media card) or by making them available for downloading over a communications network, such as the Internet. The computer-executable instructions could be bundled with one or more software systems. For example, visiting a website that includes software system functionality could trigger a download event for the computer-executable instructions.

The above-described embodiments are intended to be examples of the present invention and alterations and modifications may be effected thereto, by those of skill in the art, without departing from the scope of the invention that is defined solely by the claims appended hereto.

What is claimed is:

1. A method for registering software systems in data-sharing sessions based on data-sharing session definitions, each data-sharing session definition having a priority value assigned thereto to create a prioritized data-sharing session definition, each prioritized data-sharing session definition defining a data-sharing session in which multiple independent software systems share data values for semantically-identified data items and request data items that they need based on the semantics of the data items, wherein the prioritized data-sharing session definition with the highest priority value has the highest priority, and relative values of the priority values specify the relative priorities of said prioritized data-sharing session definitions, the method comprising:

storing, in storage of a computer system, a set of said prioritized data-sharing session definitions, each of said prioritized data-sharing session definitions identifying a set of software system types permitted to participate in data-sharing sessions governed by said prioritized data-sharing session definition;

receiving a participant registration request from a first software system;

upon receiving said participant registration request, determining a priority value for each of a first subset of said prioritized data-sharing session definitions, and then identifying a selected prioritized data-sharing session definition in said first subset having the highest priority according to the priority value of said selected prioritized data-sharing session definition that was determined upon receiving said participant registration request; and in response to said identification of said selected sharing session definition, registering said first software system in one of said data-sharing sessions corresponding to said selected prioritized data-sharing session definition.

2. The method of claim 1, wherein said first subset of said prioritized data-sharing session definitions corresponds to said prioritized data-sharing session definitions identifying one of said software system types corresponding to said first software system.

3. The method of claim 2, wherein said computer system limits participation in each said data-sharing session to one of each said software system type identified in said prioritized data-sharing session definition governing said data-sharing session, and further comprising, prior to said registering:
creating a new one of said data-sharing sessions governed by said one selected prioritized data-sharing session definition if there is an absence of said data-sharing sessions governed by said one selected prioritized data-sharing session definition in which said first software system can be registered.

4. The method of claim 1, wherein said determining comprises:
retrieving said priority values associated with said first software system.

5. The method of claim 4, wherein said priority values are also associated with a user role.

6. The method of claim 4, wherein said priority values are also associated with a time period.

7. The method of claim 4, wherein said priority values are also associated with a user.

8. The method of claim 3, wherein said determining comprises:
identifying a second subset of said first subset of said prioritized data-sharing session definitions associated with said data-sharing sessions having capacity for said first software system; and
increasing at least some of said priority values for said second subset.

9. The method of claim 4, wherein said determining comprises:
identifying a third subset of said first subset of said prioritized data-sharing session definitions associated with said data-sharing sessions in which other software systems of said software system type of said first software system are registered; and
decreasing at least some of said priority values in said third subset.

10. The method of claim 4, wherein said determining comprises:
identifying a fourth subset of said first subset of said prioritized data-sharing session definitions associated with said data-sharing sessions having capacity for said first software system and in which at least one other software system of a key software system type is registered; and
increasing at least some of said priority values for said second subset.

11. The method of claim 4, wherein said determining comprises:
identifying a fifth subset of said first subset of said prioritized data-sharing session definitions associated with said data-sharing sessions having capacity for said first software system and in which key indicator data has been shared by another software system; and
increasing at least some of said priority values for said second subset.

12. The method of claim 2, wherein said first software system is associated with a first user, and wherein said determining comprises:
determining which of said prioritized data-sharing session definitions govern each of said data-sharing sessions associated with a group of other users in which other software systems of said one software system type are registered in; and
adjusting said priority values for said prioritized data-sharing session definitions for said data-sharing sessions in which said other software systems are registered in.

13. The method of claim 1, further comprising:
launching a second software system identified in said one prioritized data-sharing session definition as permitted to participate in said data-sharing sessions governed by said one prioritized data-sharing session definition.

14. The method of claim 13, wherein said first software system is executed by a personal computing device and said launching of said second software system occurs on said personal computing device.

15. The method of claim 1, wherein said determining comprises: calculating said priority values using a formula.

16. The method of claim 15, wherein heuristic data is an input in said formula.

17. The method of claim 16, wherein said heuristic data includes identifiers of said prioritized data-sharing session definitions used to create said data-sharing sessions that were most recently created.

18. The method of claim 16, wherein said heuristic data includes identifiers of said prioritized data-sharing session definitions used to create said data-sharing sessions that were earliest created.

19. The method of claim 16, wherein said heuristic data includes identifiers of said prioritized data-sharing session definitions used to create said data-sharing sessions in which the most recent data-sharing activity occurred.

20. The method of claim 16, wherein said heuristic data includes identifiers of said prioritized data-sharing session definitions most often used to create said data-sharing sessions across a group of users.

21. The method of claim 16, wherein said heuristic data includes identifiers of said prioritized data-sharing session definitions used to create said data-sharing sessions successfully used to complete tasks.

22. A method for registering software systems in data-sharing sessions based on data-sharing session definitions, each data-sharing session having a priority value assigned thereto to create a prioritized data-sharing session definition, each prioritized data-sharing session definition defining a data-sharing session in which multiple independent software systems share data values for semantically-identified data items and request data items that they need based on the semantics of the data items, the method comprising;
storing, in storage of a computer system, a set of prioritized data-sharing session definitions, each of said prioritized data-sharing session definitions identifying a set of software system types permitted to participate in data-sharing sessions governed by said prioritized data-sharing session definition;
receiving a participant registration request from a software system;
determining, via said computer system for said participant registration request, a priority value for each of a first subset of said prioritized data-sharing session definitions, relative values of the priority values specifying the relative priorities of said prioritized data-sharing session definitions, wherein the prioritized data-sharing session definition with the highest priority value has the highest priority;

presenting a list of said first subset of said prioritized data-sharing session definitions ordered using said priority values; and registering said software system in a data-sharing session governed by one of said prioritized data-sharing session definitions selected by a user from said list.

23. The method of claim 22, wherein said first subset of said prioritized data-sharing session definitions corresponds to said prioritized data-sharing session definitions identifying one of said software system types corresponding to said first software system.

24. The method of claim 23, further comprising:

recording said one prioritized data-sharing session definition selected by said user; and increasing said priority value for said one prioritized data-sharing session definition when subsequently determining said priority value for said one prioritized data-sharing session definition.

25. A computer system for registering software systems in data-sharing sessions based on data-sharing session definitions, each data-sharing session having a priority value assigned thereto to create a prioritized data-sharing session definition, each prioritized data-sharing session definition defining a data-sharing session in which multiple independent software systems share data values for semantically-identified data items and request data items that they need based on the semantics of the data items, the system comprising:

a processor;

storage storing a set of prioritized data-sharing session definitions, each of said prioritized data-sharing session definitions identifying a set of software system types permitted to participate in data-sharing sessions governed by said prioritized data-sharing session definition; and a server executed by said processor and receiving a participant registration request from a first software system, determining, for said participant registration request, a priority value for each of a first subset of said prioritized data-sharing session definitions, relative values of the priority values specifying the relative priorities of said prioritized data-sharing session definitions, wherein the prioritized data-sharing session definition with the highest priority value has the highest priority, and registering said first software system in one of said data-sharing sessions governed by one of said prioritized data-sharing session definitions based on said selected one of said prioritized data-sharing session definitions having the highest priority according to said priority values.

26. The computer system of claim 25, wherein said first subset of said prioritized data-sharing session definitions corresponds to said prioritized data-sharing session definitions identifying one of said software system types corresponding to said first software system.

27. The computer system of claim 26, wherein said server limits participation in each said data-sharing session to one of each said software system type identified in said prioritized data-sharing session definition governing said data-sharing session, and prior to said registering, said server creates a new one of said data-sharing sessions governed by said one selected prioritized data-sharing session definition if there is an absence of said data-sharing sessions governed by said one selected prioritized data-sharing session definition in which said first software system can be registered.

28. The computer system of claim 25, wherein said server retrieves said priority values associated with said first software system.

29. The computer system of claim 28, wherein said priority values are also associated with a user role.

30. The computer system of claim 28, wherein said priority values are also associated with a time period.

31. The computer system of claim 28, wherein said priority values are also associated with a user.

32. The computer system of claim 27, wherein said server identifies a second subset of said first subset of said prioritized data-sharing session definitions associated with said data-sharing sessions having capacity for said first software system, and increases at least some of said priority values for said second subset.

33. The computer system of claim 27, wherein said server identifies a third system type of said first software system are registered, and decreases at least some of said priority values in said third subset.

34. The computer system of claim 26, wherein said first software system is associated with a first user, and wherein said server determines which of said prioritized data-sharing session definitions govern each of said data-sharing sessions associated with a group of other users in which other software systems of said one software system type are registered in, and adjusts said priority values for said prioritized data-sharing session definitions for said data-sharing sessions in which said other software systems are registered in.

35. The computer system of claim 25, wherein said server launches a second software system identified in said one prioritized data-sharing session definition as permitted to participate in said data-sharing sessions governed by said one prioritized data-sharing session definition.

36. A computer system for registering software systems in data-sharing sessions based on data-sharing session definitions, each data-sharing session having a priority value assigned thereto to create a prioritized data-sharing session definition, each prioritized data-sharing session definition defining a data-sharing session in which multiple independent software systems share data values for semantically-identified data items and request data items that they need based on the semantics of the data items, the system comprising:

a processor;

storage storing a set of prioritized data-sharing session definitions, each of said prioritized data-sharing session definitions identifying a set of software system types permitted to participate in data-sharing sessions governed by said prioritized data-sharing session definition; and a server executed by said processor and receiving a participant registration request from a software system, determining, for said participant registration request, a priority value for each of a first subset of said prioritized data-sharing session definitions, presenting a list of said first subset of said prioritized data-sharing session definitions ordered using said priority values, and registering said software system in a data-sharing session governed by one of said prioritized data-sharing session definitions selected by a user from said list, wherein relative values of the priority values specify the relative priorities of said prioritized data-sharing session definitions, wherein the prioritized data-sharing session definition with the highest priority value has the highest priority.

37. The computer system of claim 36, wherein said first subset of said prioritized data-sharing session definitions corresponds to said prioritized data-sharing session definitions identifying one of said software system types corresponding to said first software system.

38. The computer system of claim 37, wherein said server records said one prioritized data-sharing session definition selected by said user, and increases said priority value for said one prioritized data-sharing session definition when subsequently determining said priority value for said one prioritized data-sharing session definition.

* * * * *

UNITED STATES PATENT AND TRADEMARK OFFICE
CERTIFICATE OF CORRECTION

PATENT NO. : 10,313,433 B2
APPLICATION NO. : 14/165261
DATED : June 4, 2019
INVENTOR(S) : Stephen Paul Owens et al.

Page 1 of 1

It is certified that error appears in the above-identified patent and that said Letters Patent is hereby corrected as shown below:

On the Title Page

Item (54) and in the Specification Column 1, Line 1, "METHOD AND SYSTEM FOR REGISTERING SOFTWARE SYSTEMS AND DATA-SHARING SESSIONS" should be
-- METHOD AND SYSTEM FOR REGISTERING SOFTWARE SYSTEMS IN DATA-SHARING SESSIONS --

Signed and Sealed this
Thirty-first Day of March, 2020

Andrei Iancu
*Director of the United States Patent and Trademark Office*